(12) United States Patent
Huang et al.

(10) Patent No.: US 10,879,951 B2
(45) Date of Patent: Dec. 29, 2020

(54) SYSTEMS AND METHODS FOR SYNCHRONIZATION BY TRANSCEIVERS WITH OQPSK DEMODULATION

(71) Applicant: GUANGZHOU ON-BRIGHT ELECTRONICS CO., LTD., Guangzhou (CN)

(72) Inventors: Jiaqiang Huang, Guangzhou (CN); Jiapeng Zhang, Guangzhou (CN)

(73) Assignee: Guangzhou On-Bright Electronics Co., Ltd., Guangzhou (CN)

(*) Notice: Subject to any disclaimer, the term of this patent is extended or adjusted under 35 U.S.C. 154(b) by 0 days.

(21) Appl. No.: 16/124,983

(22) Filed: Sep. 7, 2018

(65) Prior Publication Data
US 2020/0059261 A1 Feb. 20, 2020

(30) Foreign Application Priority Data

Aug. 16, 2018 (CN) .......................... 2018 1 0936992

(51) Int. Cl.
H04B 1/707 (2011.01)
H04B 1/7073 (2011.01)
H04B 1/709 (2011.01)
H04L 27/38 (2006.01)

(52) U.S. Cl.
CPC .......... *H04B 1/7073* (2013.01); *H04B 1/709* (2013.01); *H04L 27/3818* (2013.01); *H04B 2201/694* (2013.01); *H04B 2201/7073* (2013.01)

(58) Field of Classification Search
CPC ............................. H04B 1/7073; H04B 1/709; H04B 2201/694; H04B 2201/7073; H04L 27/3818

USPC ......................................................... 375/148
See application file for complete search history.

(56) References Cited

U.S. PATENT DOCUMENTS

| 6,201,828 B1* | 3/2001 | El-Tarhuni | H04B 1/70757 370/342 |
| 2003/0152022 A1* | 8/2003 | Hosur | H04L 27/2602 370/208 |
| 2012/0200348 A1 | 8/2012 | Mulvaney | |

FOREIGN PATENT DOCUMENTS

| CN | 1893407 A | 1/2007 |
| CN | 1976330 A | 6/2007 |
| CN | 102577289 A | 7/2012 |
| CN | 102577289 | 12/2014 |
| CN | 105122659 | 7/2017 |

* cited by examiner

*Primary Examiner* — Kevin M Burd
(74) *Attorney, Agent, or Firm* — Faegre Drinker Biddle & Reath LLP

(57) ABSTRACT

System and method for processing an analog signal. For example, a demodulator for processing an analog signal includes one or more analog-to-digital converters configured to receive an analog signal and generate a digital signal based at least in part on the analog signal, and a correlator coupled to the one or more analog-to-digital converters and configured to generate a stream of correlation results including a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result.

17 Claims, 18 Drawing Sheets

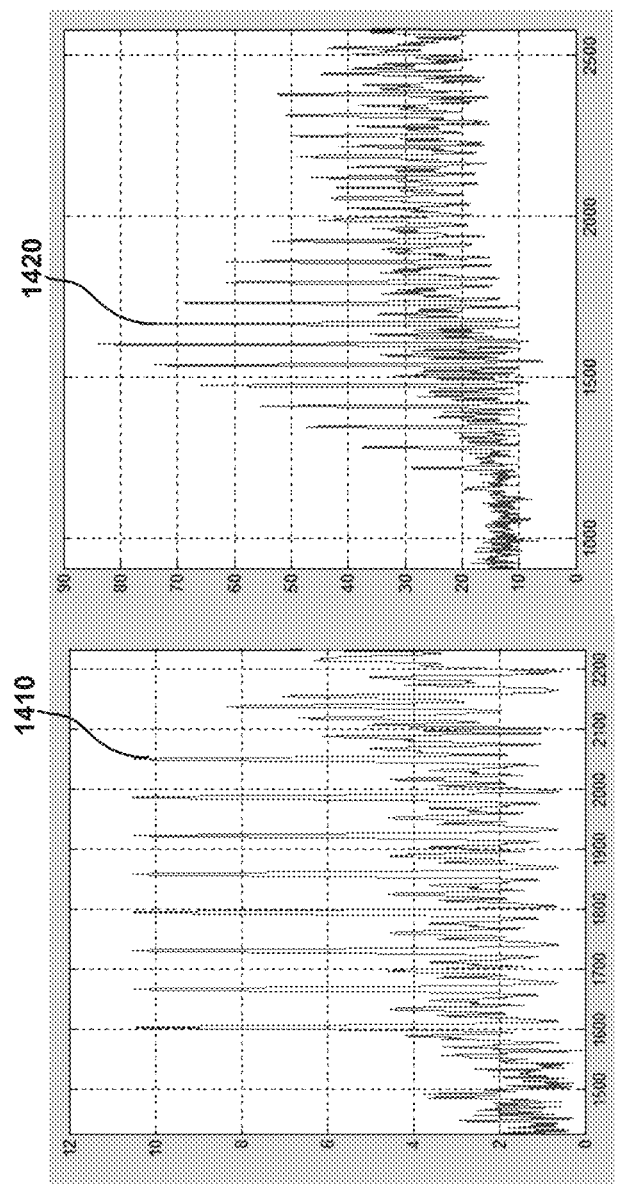

SYSTEMS AND METHODS FOR SYNCHRONIZATION BY TRANSCEIVERS WITH OQPSK DEMODULATION

1. CROSS-REFERENCES TO RELATED APPLICATIONS

This application claims priority to Chinese Patent Application No. 201810936992.7, filed Aug. 16, 2018, incorporated by reference herein for all purposes.

2. BACKGROUND OF THE INVENTION

Certain embodiments of the present invention are directed to wireless communication signal processing. More particularly, some embodiments of the invention provide systems and methods for synchronization by transceivers with offset quadrature phase-shift keying (OQPSK) demodulation. Merely by way of example, some embodiments of the invention have been applied to the IEEE 802.15.4 standard. But it would be recognized that the invention has a much broader range of applicability.

With recent advancement of Internet of Things (IoT), interconnections of various objects have become a goal of significant research and development. To interconnect objects, small-scale wireless communication networks have become popular. One type of such network is designed to operate under the IEEE 802.15.4 standard, which is suitable for wireless personal area networks (WPANs). Based on the IEEE 802.15.4 standard, certain upper-layer protocols have also been developed, such as Zigbee and Thread.

FIG. 1 is a simplified conventional diagram showing a network that operates under the IEEE 802.15.4 standard. The network 100 that operates under the IEEE 802.15.4 standard includes nodes 110, 120, 130, and 140. The nodes 110, 120, 130, and 140 use radio-frequency signals to form at least part of the network 100 and communicate between nodes. Each node of the nodes 110, 120, 130, and 140 represents an object that communicates with one or more other objects according to the IEEE 802.15.4 standard. As an example, each node represents an object, and the object is an electronic device.

FIG. 2 is a simplified conventional diagram showing certain components of a node of the IEEE 802.15.4 network 100 as shown in FIG. 1. The node 200 includes a radio-frequency transceiver 210 and a controller 220. The radio-frequency transceiver 210 includes a receiver 230 and a transmitter 240. The receiver 230 receives one or more wireless signals (e.g., a radio-frequency analog signal 414 as shown in FIG. 4) from one or more other nodes according to the IEEE 802.15.4 standard, and the transmitter 240 sends one or more wireless signals to one or more other nodes according to the IEEE 802.15.4 standard. Additionally, within the node 200, the radio-frequency transceiver 210 communicates with the controller 220. As an example, the node 200 is the node 110, 120, 130, or 140. In another example, the node 200 represents an electronic device.

FIG. 3 is a simplified conventional diagram showing certain components of a frame at physical layer according to the IEEE 802.15.4 standard. The frame 300 includes a synchronization header (SHR) 310, a physical header (PHR) 320, and a physical (PHY) payload 330.

As shown in FIG. 3, the SHR 310 includes a preamble section 312 and a start frame delimiter (SFD) section 314. The preamble section 312 contains eight symbols, each of which has a value of zero. Also, the preamble section 312 is 4-octet long, and the SFD section 314 is 1-octet long. Additionally, the PHR 320 includes a frame length section 322 and a reserved section 324. The frame length section 322 is 7-bit long, and the reserved section 324 is 1-bit long. The total length of the PHR 320 is 1 octet, which is equal to 8 bits. Moreover, the physical (PHY) payload 330 includes a physical service data unit (PSDU) 332, which has a variable length.

To transmit the frame 300, a predetermined spread-spectrum pseudo-noise (PN) sequence is used to convert the frame 300 into a spread-spectrum signal. The length of the spread-spectrum PN sequence is represented by N, whose value depends on frequency band and data transmission rate. For example, N is equal to sixteen or thirty-two. The spread-spectrum signal includes pulses (e.g., chips), each of which corresponds to a time duration of a chip period. As indicated above, the preamble section 312 contains eight symbols. In the spread-spectrum signal, each of these symbols is represented by N pulses (e.g., N chips), and the preamble section 312 is represented by 8×N pulses (e.g., 8×N chips).

FIG. 4 is a simplified conventional diagram showing an offset quadrature phase-shift keying (OQPSK) demodulator as part of the receiver 230 of the radio-frequency transceiver 210 as shown in FIG. 2. The OQPSK demodulator 400 includes analog-to-digital converters 410 and 412, a delay and difference module 420, a correlator 430, a symbol synchronization selection module 440, and a symbol decoder 450.

The analog-to-digital converters 410 and 412 receive the radio-frequency (RF) analog signal 414 that is a spread-spectrum signal. The RF analog signal 414 is represented by a complex function of time (e.g., r(t)). Specifically, the real part of the complex function (e.g., Re[r(t)]) is received by the analog-to-digital converter 410, and the imaginary part of the complex function (e.g., Im[r(t)]) is received by the analog-to-digital converter 412. In response, the analog-to-digital converters 410 and 412 output a digital signal 416, which includes an in-phase component (e.g., "I" of the digital signal 416) and a quadrature component (e.g., "Q" of the digital signal 416). Specifically, the in-phase component of the digital signal 416 is generated by the analog-to-digital converter 410, and the quadrature component of the digital signal 416 is generated by the analog-to-digital converter 412. As shown in FIG. 4, the delay and difference module 420 receives both the in-phase component and the quadrature component of the digital signal 416.

FIG. 5 is a simplified conventional diagram showing certain components of the delay and difference module 420 as shown in FIG. 4. The delay and difference module 420 includes a delay component 510, a conjugation component 520, and a multiplication component 530.

The delay component 510 receives the digital signal 416 represented by a complex function of time, and generates a delayed digital signal 512 represented by another complex function of time. The delayed digital signal 512 is received by the conjugation component 520, which in response generates a delayed conjugated signal 522 that is a complex conjugate of the delayed digital signal 512. As shown in FIG. 4, the multiplication component 530 receives the delayed conjugated signal 522 and also receives the digital signal 416 without delay. The digital signal 416 without delay is represented by a complex function of time, and the delayed conjugated signal 522 is represented by another complex function of time. The digital signal 416 without delay and the delayed conjugated signal 522 are multiplied by the multiplication component 530, which generates a signal 422 that represents the result of the multiplication. As shown in FIG. 4, the signal 422 is received by the correlator 430, which also receives a spread-spectrum pseudo-noise (PN) sequence 432.

FIG. 6 is a simplified conventional diagram showing certain components of the correlator 430 as shown in FIG. 4. The correlator 430 includes multiplication components 610 and 612 and an adder 620.

The multiplication component 610 receives an in-phase component of the signal 422 (e.g., "I" of the signal 422 as represented by $422_I$) and an in-phase component of the spread-spectrum PN sequence 432 (e.g., "I" of the sequence 432 as represented by $432_I$). The in-phase component of the signal 422 and the in-phase component of the spread-spectrum PN sequence 432 are multiplied by the multiplication component 610, which in response outputs a multiplication result 614 to the adder 620. Additionally, the multiplication component 612 receives a quadrature component of the signal 422 (e.g., "Q" of the signal 422 as represented by $422_Q$) and a quadrature component of the spread-spectrum PN sequence 432 (e.g., "Q" of the sequence 432 as represented by $432_Q$). The quadrature component of the signal 422 and the quadrature component of the spread-spectrum PN sequence 432 are multiplied by the multiplication component 612, which in response outputs a multiplication result 616 to the adder 620. Moreover, the adder 620 receives the multiplication results 614 and 616, adds the multiplication results 614 and 616, and generates a correlation result 434. As shown in FIG. 4, the correlation result 434 is received by the symbol synchronization selection module 440, which also receives a predetermined threshold 442.

FIG. 7 is a simplified conventional diagram showing a method performed by the symbol synchronization selection module 440 as shown in FIG. 4. The method 700 includes a process 710 for receiving a predetermined threshold 442, a process 720 for receiving a correlation result 434, a process 730 for determining whether the correlation result 434 is larger than the predetermined threshold 442, a process 740 for determining a point of symbol synchronization 444, and a process 750 for outputting the point of symbol synchronization 444.

At the process 710, the symbol synchronization selection module 440 receives a predetermined threshold 442. At the process 720, the symbol synchronization selection module 440 receives a correlation result 434 from the correlator 430. At the process 730, the symbol synchronization selection module 440 compares the correlation result 434 and the predetermined threshold 442 and decides whether the correlation result 434 is larger than the predetermined threshold 442. If the correlation result 434 is not larger than the predetermined threshold 442, the process 720 is performed to receive another correlation result 434. If the correlation result 434 is larger than the predetermined threshold 442, the process 740 is performed. At the process 740, the symbol synchronization selection module 440 determines a point of symbol synchronization 444. The point of symbol synchronization 444 corresponds to a chip of the spread-spectrum signal 414, and the chip of the spread-spectrum signal 414 is used to generate the correlation result 434 that has been determined to be larger than the predetermined threshold 442. For example, the point of symbol synchronization 444 represents the beginning of the preamble section 312 of the frame 300. In another example, the point of symbol synchronization 444 represents the end of the preamble section 312 of the frame 300. At the process 750, the symbol synchronization selection module 440 outputs the point of symbol synchronization 444 to the symbol decoder 450 as shown in FIG. 4.

As shown in FIG. 4, the symbol decoder 450 receives the point of symbol synchronization 444, uses the point of symbol synchronization 444 as an indication for the beginning of the preamble section 312 of the frame 300 or the end of the preamble section 312 of the frame 300, decodes the spread-spectrum signal 414 to obtain information as contained in the frame 300, and outputs obtained information as a signal 452.

As shown in FIGS. 1-7, the conventional technology for determining a point of symbol synchronization often uses a predetermined threshold. If the noise is large and the signal-to-noise ratio is small, the correlation result generated from the noise alone may exceed the predetermined threshold, causing false identification of the point of symbol synchronization.

As discussed above, under the IEEE 802.15.4 standard, a wireless personal area network (WPAN) can provide a low-cost, low-energy-consumption, low-complexity, and/or small-size solution for interconnections of multiple nodes. Therefore, the wireless personal area network (WPAN) has become one of the major types of wireless networks and has been widely used in the application of Internet of Things (IoT).

Under the IEEE 802.15.4 standard, however, because of limitations on cost, energy consumption, and size, the radio-frequency transceiver (e.g., the radio-frequency transceiver 210) usually cannot, as effectively as a radio-frequency transceiver of a large-scale wireless network, control drifting of frequency and phase or improve the signal-to-noise ratio. The radio-frequency transceiver under the IEEE 802.15.4 standard (e.g., the radio-frequency transceiver 210) often cannot accurately identify the point of symbol synchronization, and this lack of accuracy can adversely affect the decoding of the spread-spectrum signal (e.g., the spread-spectrum signal 414).

Hence it is highly desirable to improve the techniques of radio-frequency transceivers under the IEEE 802.15.4 standard that also use the offset quadrature phase-shift keying (OQPSK) demodulation scheme, so that the accuracy of identifying the point of symbol synchronization can be improved for high-energy-efficiency and low-cost radio-frequency transceivers.

3. BRIEF SUMMARY OF THE INVENTION

Certain embodiments of the present invention are directed to wireless communication signal processing. More particularly, some embodiments of the invention provide systems and methods for synchronization by transceivers with offset quadrature phase-shift keying (OQPSK) demodulation. Merely by way of example, some embodiments of the invention have been applied to the IEEE 802.15.4 standard. But it would be recognized that the invention has a much broader range of applicability.

According to one embodiment, a demodulator for processing an analog signal includes one or more analog-to-digital converters configured to receive an analog signal and generate a digital signal based at least in part on the analog signal, and a correlator coupled to the one or more analog-to-digital converters and configured to generate a stream of correlation results including a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result. Additionally, the demodulator includes an adder coupled to the correlator and configured to receive first selected correlation results of the first plurality of correlation results and determine a first sum of the first selected correlation results, receive second selected correlation results of the second plurality of correlation results and determine a second sum of the second selected correlation results, and receive third selected correlation results of the third plurality of correlation results and determine a third sum of the third selected correlation results. Moreover, the demodulator includes a first storage configured to receive and store the first sum at a first time, receive and store the second sum at a second time, and receive and store the third sum at a third time. The first time precedes the second time, and the second time precedes the third time. Also, the demodulator includes a symbol synchronization selector coupled to the first storage and configured to determine a point of symbol synchronization based at least in part on the first sum, the second sum and the third sum.

According to another embodiment, a demodulator for processing an analog signal includes a correlation result generator configured to receive an analog signal and generate a stream of correlation results based at least in part on the analog signal. The stream of correlation results includes a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result. Additionally, the demodulator includes an adder coupled to the correlation result generator and configured to receive first selected correlation results of the first plurality of correlation results and determine a first sum of the first selected correlation results, receive second selected correlation results of the second plurality of correlation results and determine a second sum of the second selected correlation results, and receive third selected correlation results of the third plurality of correlation results and determine a third sum of the third selected correlation results. Moreover, the demodulator includes a symbol synchronization selector coupled to the adder and configured to compare the first sum, the second sum, and the third sum and to determine a point of symbol synchronization based at least in part on the first sum, the second sum and the third sum. The symbol synchronization selector is further configured to, if the second sum is larger than the first sum and the third sum, determine the second sum being a present peak corresponding to a present peak time and search for a next peak within a time window. The time window starts at a beginning time and ends at an end time. The beginning time follows the present peak time by a first predetermined time duration, and the end time follows the beginning time by a second predetermined time duration.

According to yet another embodiment, a demodulator for processing an analog signal includes a correlation result generator configured to receive an analog signal and generate a stream of correlation results based at least in part on the analog signal. The stream of correlation results includes a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result. Additionally, the demodulator includes an adder coupled to the correlation result generator and configured to receive first selected correlation results of the first plurality of correlation results and determine a first sum of the first selected correlation results, receive second selected correlation results of the second plurality of correlation results and determine a second sum of the second selected correlation results, and receive third selected correlation results of the third plurality of correlation results and determine a third sum of the third selected correlation results. Moreover, the demodulator includes a symbol synchronization selector coupled to the adder and configured to determine a point of symbol synchronization. The symbol synchronization selector is further configured to determine a present peak corresponding to a present peak time and corresponding to a first value of a peak count, and compare the first sum, the second sum, and the third sum. Additionally, the symbol synchronization selector is further configured to, if the second sum is not larger than the first sum or the third sum or is not larger than the first sum and the third sum, determine whether the first value is equal to a first predetermined value. Moreover, the symbol synchronization selector is further configured to, if the second sum is larger than the first sum and the third sum: set the second sum to be a next peak corresponding to a next peak time, determine whether the next peak is larger than the present peak, and if the next peak is not larger than the present peak, determine whether the first value is equal to the first predetermined value.

According to yet another embodiment, a method for processing an analog signal includes receiving an analog signal, generating a digital signal based at least in part on the analog signal, processing information associated with the digital signal, and generating a stream of correlation results based on at least information associated with the digital signal. The stream of correlation results includes a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result. Additionally, the method includes receiving first selected correlation results of the first plurality of correlation results, determining a first sum of the first selected correlation results, receiving second selected correlation results of the second plurality of correlation results, determining a second sum of the second selected correlation results, receiving third selected correlation results of the third plurality of correlation results, and determining a third sum of the third selected correlation results. Additionally, the method includes receiving and storing the first sum at a first time, receiving and storing the second sum at a second time, and receiving and storing the third sum at a third time. The second time follows the first time, and the third time follows the second time. Moreover, the method includes processing information associated with the first sum, the second sum, and the third sum, and determining a point of symbol synchronization based at least in part on the first sum, the second sum and the third sum.

According to yet another embodiment, a method for processing an analog signal includes receiving an analog signal, and generating a stream of correlation results based at least in part on the analog signal. The stream of correlation results includes a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result. Additionally, the method includes receiving first selected correlation results of the first plurality of correlation results, determining a first sum of the first selected correlation results, receiving second selected correlation results of the second plurality of correlation results, determining a second sum of the second selected correlation results, receiving third selected correlation results of the third plurality of correlation results, and determining a third sum of the third selected correlation results. Moreover, the method includes comparing the first sum, the second sum, and the third sum, and determining a point of symbol synchronization based at least in part on the first sum, the second sum and the third sum. The determining a point of symbol synchronization based at least in part on the first sum, the second sum and the third sum includes if the second sum is larger than the first sum and the third sum, determining the second sum being a present peak corresponding to a present peak time and searching for a next peak within a time window. The time window starts at a beginning time and ends at an end time. The beginning time follows the present peak time by a first predetermined time duration, and the end time follows the beginning time by a second predetermined time duration.

According to yet another embodiment, a method for processing an analog signal includes receiving an analog signal, and generating a stream of correlation results based at least in part on the analog signal. The stream of correlation results includes a first plurality of correlation results, a second plurality of correlation results, and a third plurality of correlation results. The first plurality of correlation results is different from the second plurality of correlation results by at least one correlation result, and the second plurality of correlation results is different from the third plurality of correlation results by at least another correlation result. Additionally, the method includes receiving first selected correlation results of the first plurality of correlation results, determining a first sum of the first selected correlation results, receiving second selected correlation results of the second plurality of correlation results, determining a second sum of the second selected correlation results, receiving third selected correlation results of the third plurality of correlation results, and determining a third sum of the third selected correlation results. Moreover, the method includes processing information associated with the first sum, the second sum, and the third sum, and determining a point of symbol synchronization. The determining a point of symbol synchronization includes determining a present peak corresponding to a present peak time and corresponding to a first value of a peak count, and comparing the first sum, the second sum, and the third sum. Additionally, the determining a point of symbol synchronization includes, if the second sum is not larger than the first sum or the third sum or is not larger than the first sum and the third sum, determining whether the first value is equal to a first predetermined value. Moreover, the determining a point of symbol synchronization includes, if the second sum is larger than the first sum and the third sum: setting the second sum to be a next peak corresponding to a next peak time, determining whether the next peak is larger than the present peak, and if the next peak is not larger than the present peak, determining whether the first value is equal to the first predetermined value.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 1:
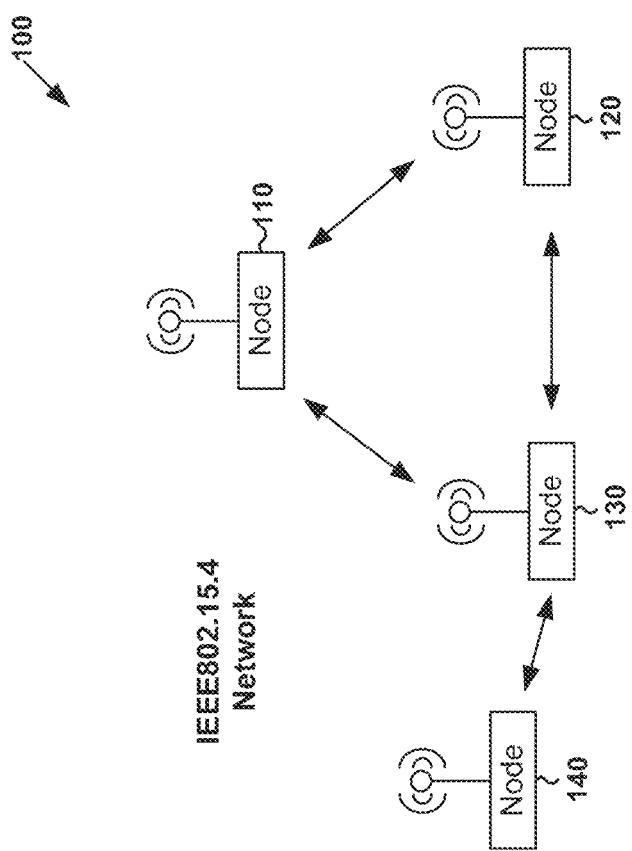
FIG. 1 is a simplified conventional diagram showing a network that operates under the IEEE 802.15.4 standard.
Figure 2:
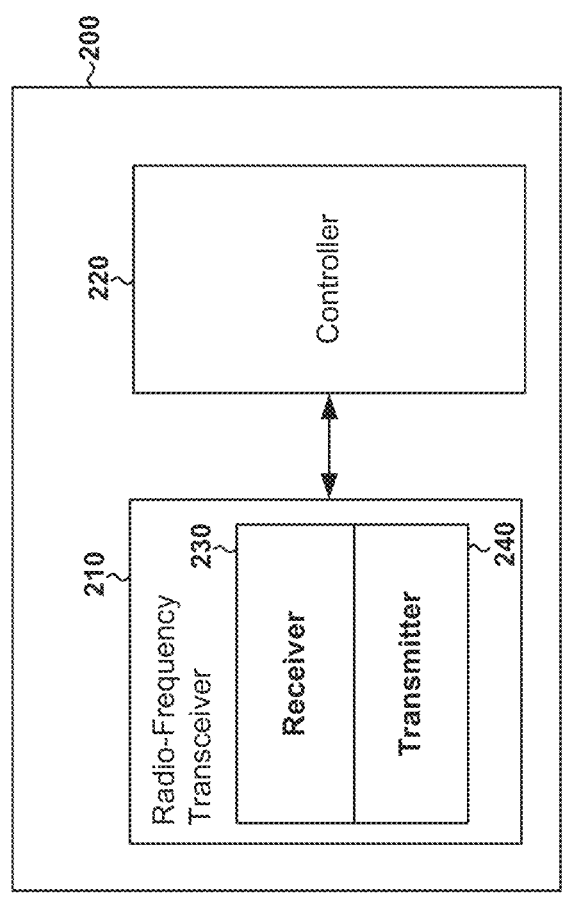
FIG. 2 is a simplified conventional diagram showing certain components of a node of the IEEE 802.15.4 network as shown in FIG. 1.
Figure 3:
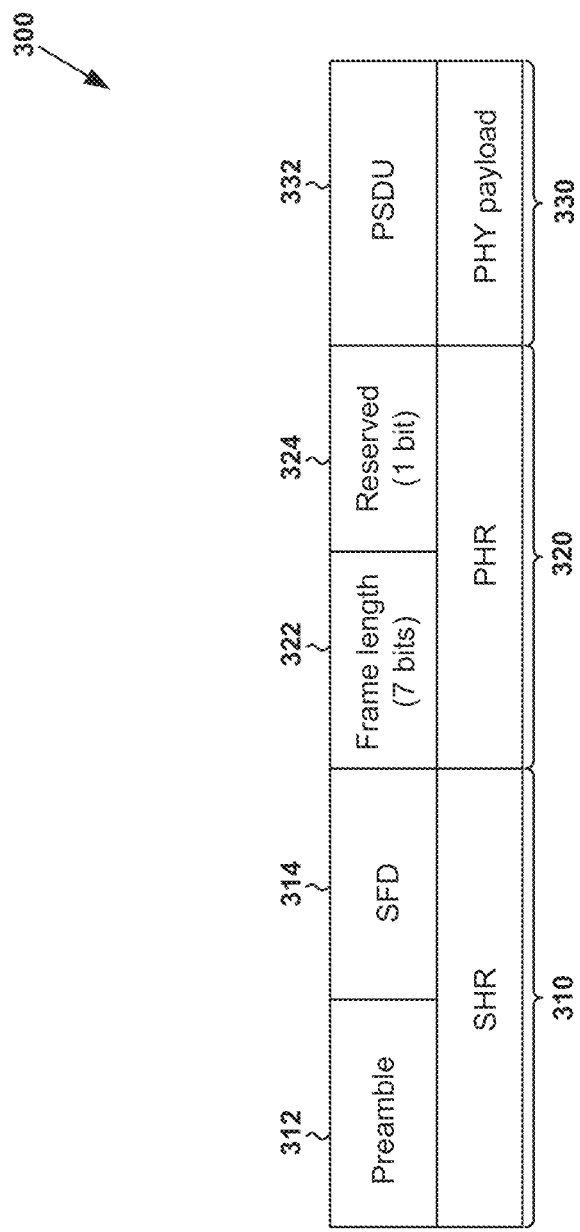
FIG. 3 is a simplified conventional diagram showing certain components of a frame at physical layer according to the IEEE 802.15.4 standard.
Figure 4:
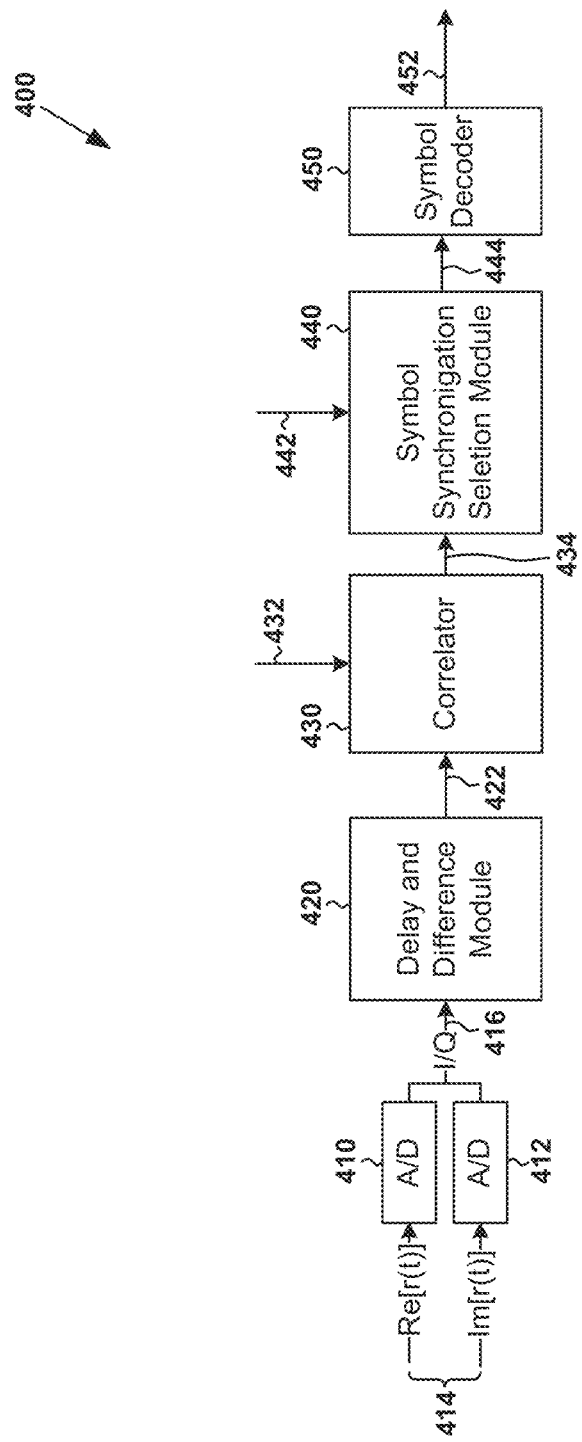
FIG. 4 is a simplified conventional diagram showing an offset quadrature phase-shift keying (OQPSK) demodulator as part of the receiver of the radio-frequency transceiver as shown in FIG. 2.
Figure 5:
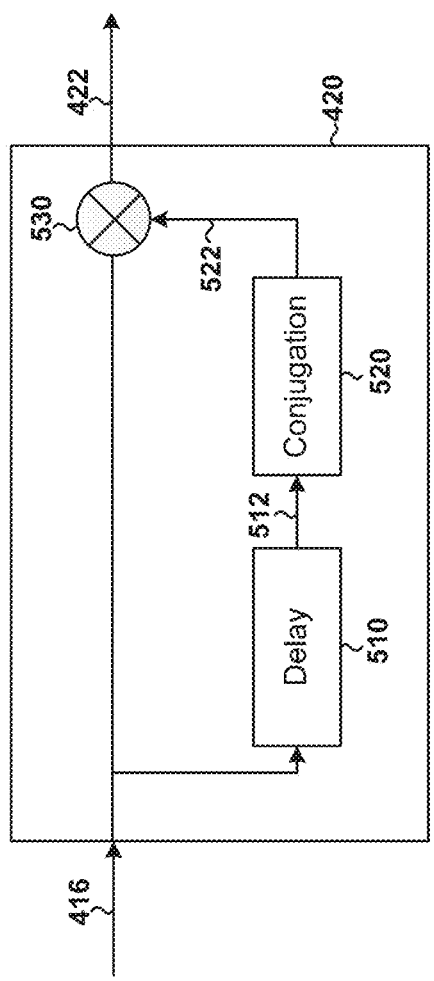
FIG. 5 is a simplified conventional diagram showing certain components of the delay and difference module as shown in FIG. 4.
Figure 6:
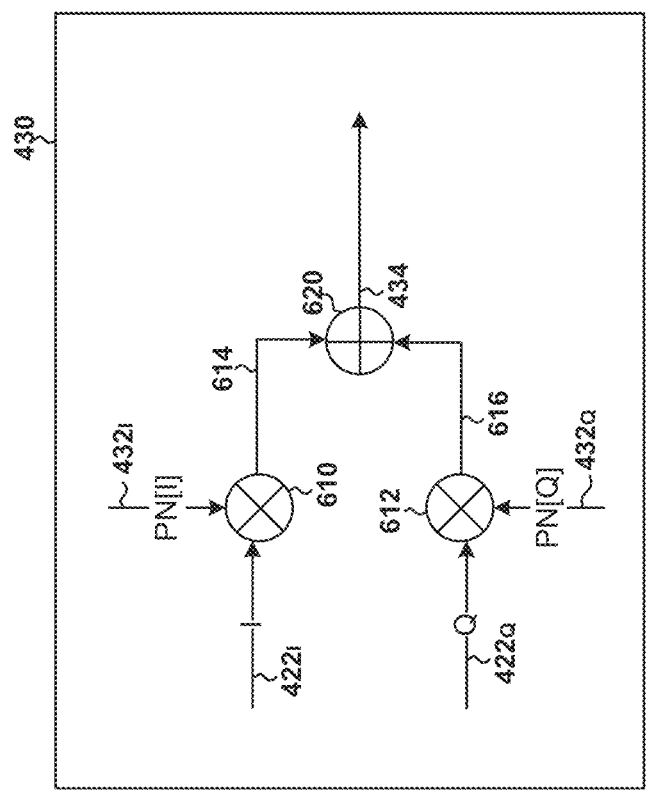
FIG. 6 is a simplified conventional diagram showing certain components of the correlator as shown in FIG. 4.
Figure 7:
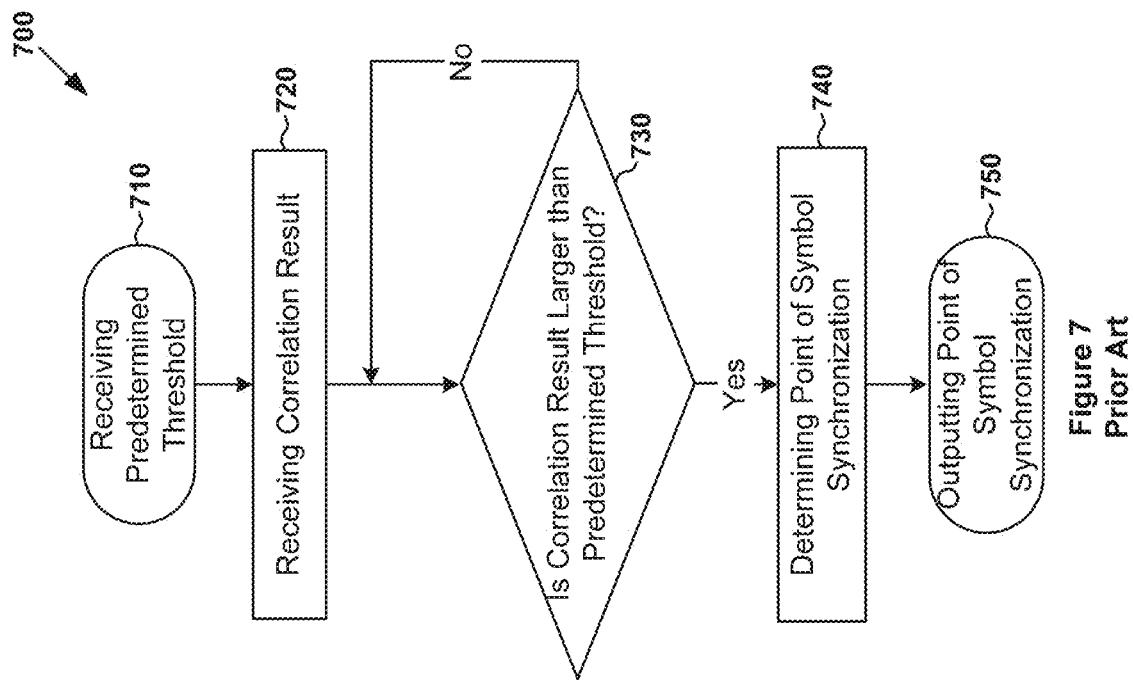
FIG. 7 is a simplified conventional diagram showing a method performed by the symbol synchronization selection module as shown in FIG. 4.
Figure 8:
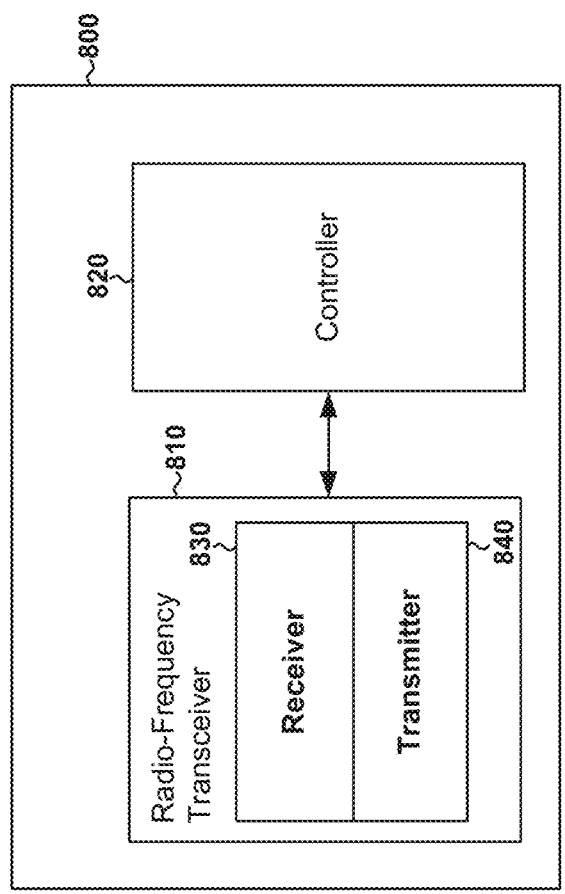
FIG. 8 is a simplified diagram showing certain components of a node of an IEEE 802.15.4 network according to one embodiment of the present invention.
Figure 9:
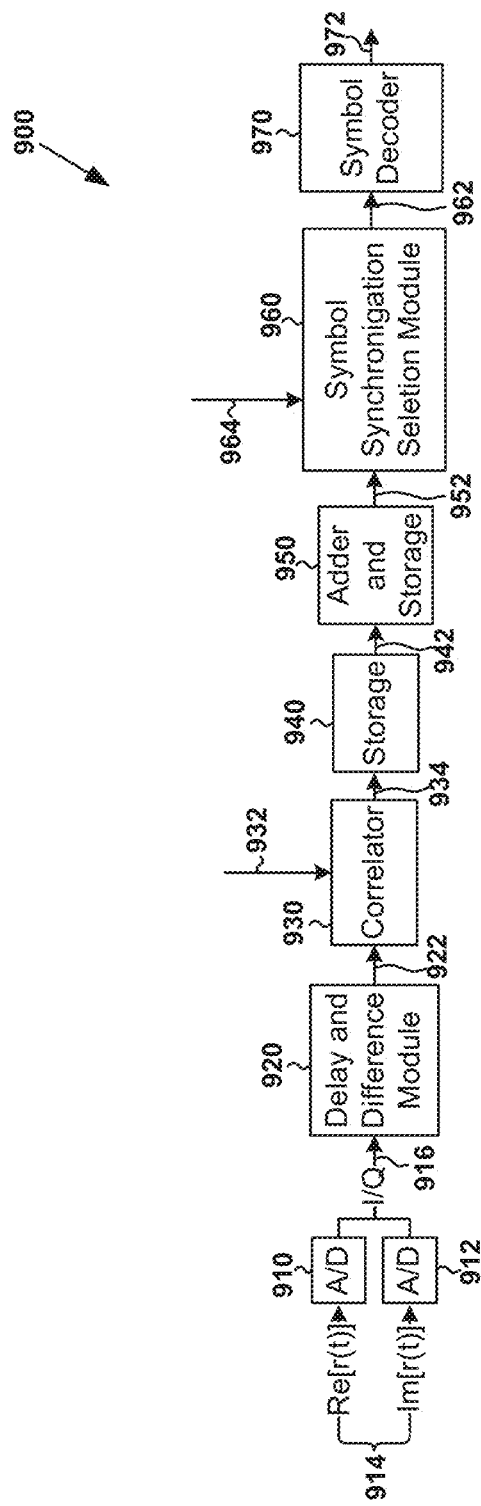
FIG. 9 is a simplified diagram showing an offset quadrature phase-shift keying (OQPSK) demodulator as part of the receiver of the radio-frequency transceiver as shown in FIG. 8 according to one embodiment of the present invention.
Figure 12:
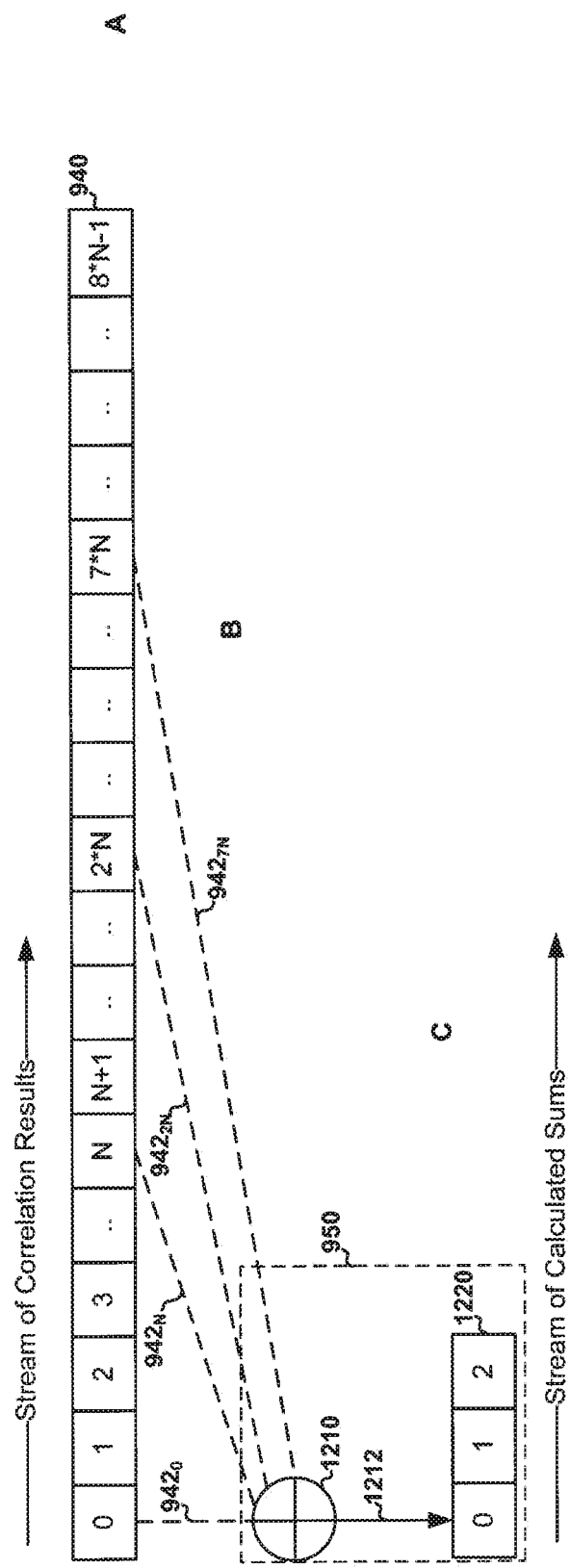

FIG. 12 includes a simplified diagram showing certain components of the storage as part of the offset quadrature phase-shift keying (OQPSK) demodulator of the receiver as shown in FIGS. 8 and 9 according to one embodiment of the present invention and also includes simplified diagrams showing certain components of the adder and stroage component as part of the offset quadrature phase-shift keying (OQPSK) demodulator of the receiver as shown in FIGS. 8 and 9 according to one embodiment of the present invention.

Figure 13:
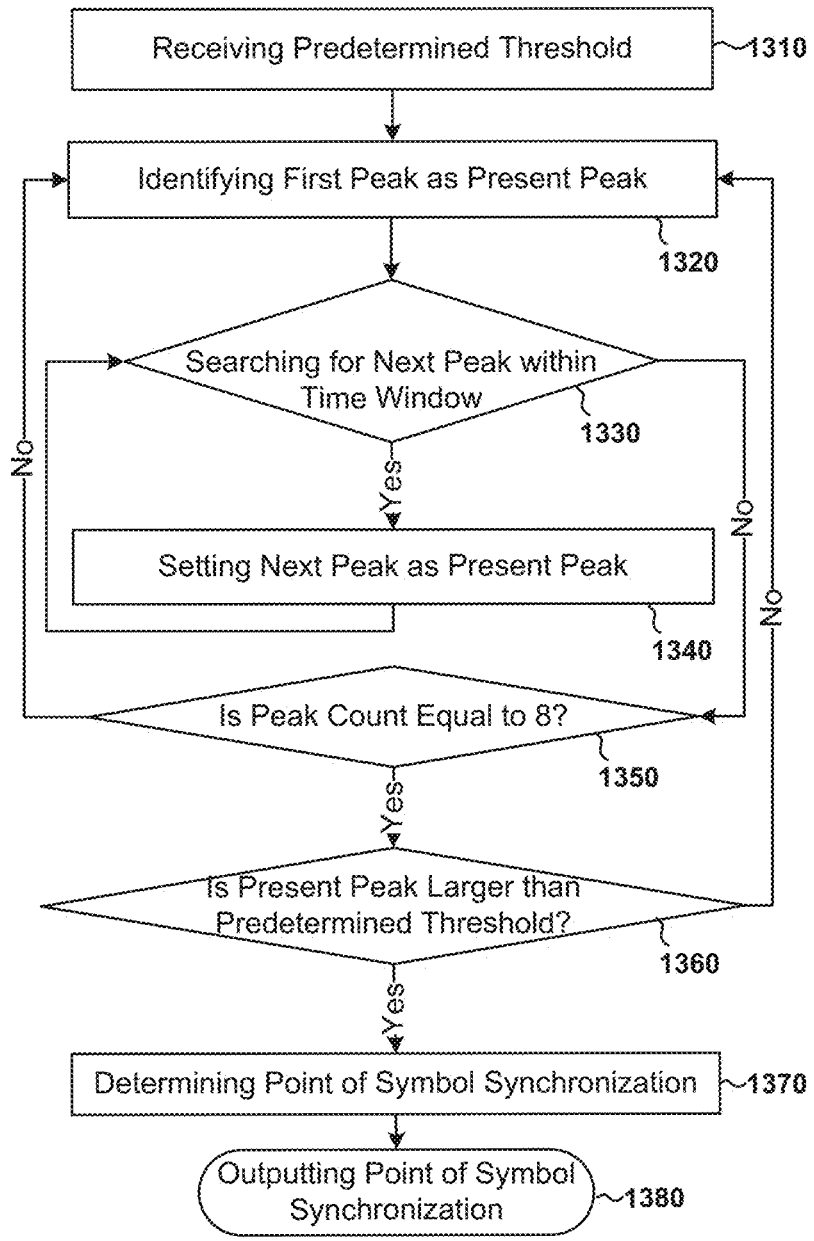

FIG. 13 is a simplified diagram showing a method performed by the symbol synchronization selection module as part of the offset quadrature phase-shift keying (OQPSK) demodulator of the receiver as shown in FIGS. 8 and 9 according to one embodiment of the present invention.

FIG. 14A is a simplified diagram showing certain correlation results according to one embodiment of the present invention, and FIG. 14B is a simplified diagram showing certain calculated sums according to one embodiment of the present invention.

Figures 15A, 15B:
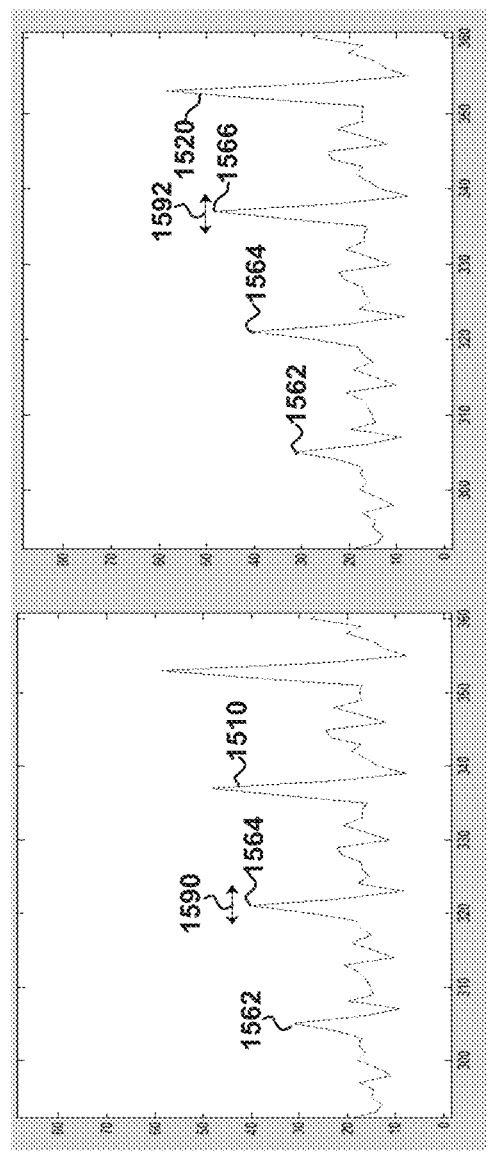
Figure 15C:
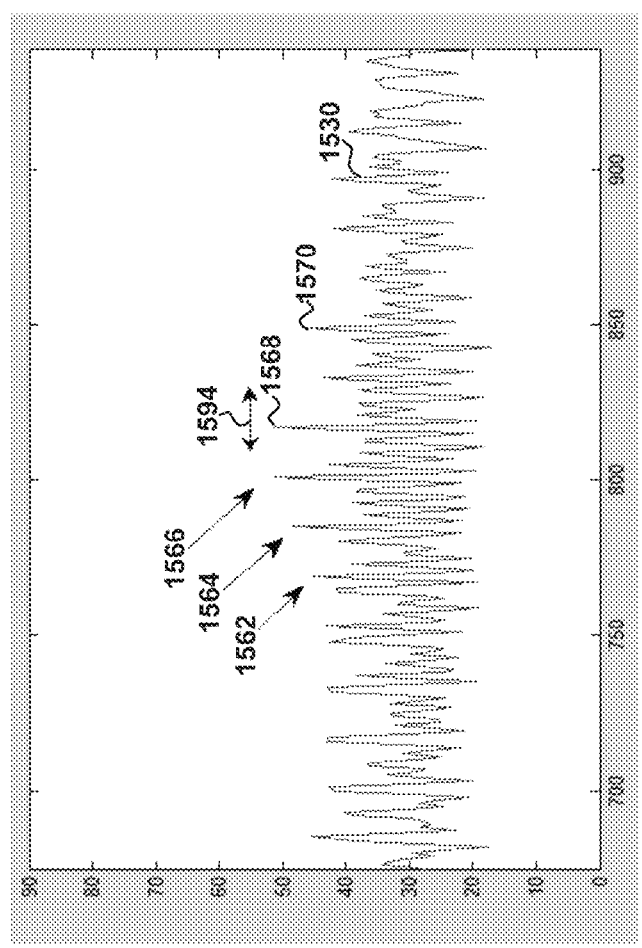

FIG. 15A is a simplified diagram showing certain calculated sums according to one embodiment of the present invention, FIG. 15B is a simplified diagram showing certain calculated sums according to another embodiment of the present invention, and FIG. 15C is a simplified diagram showing certain calculated sums according to yet another embodiment of the present invention.

Figure 16:
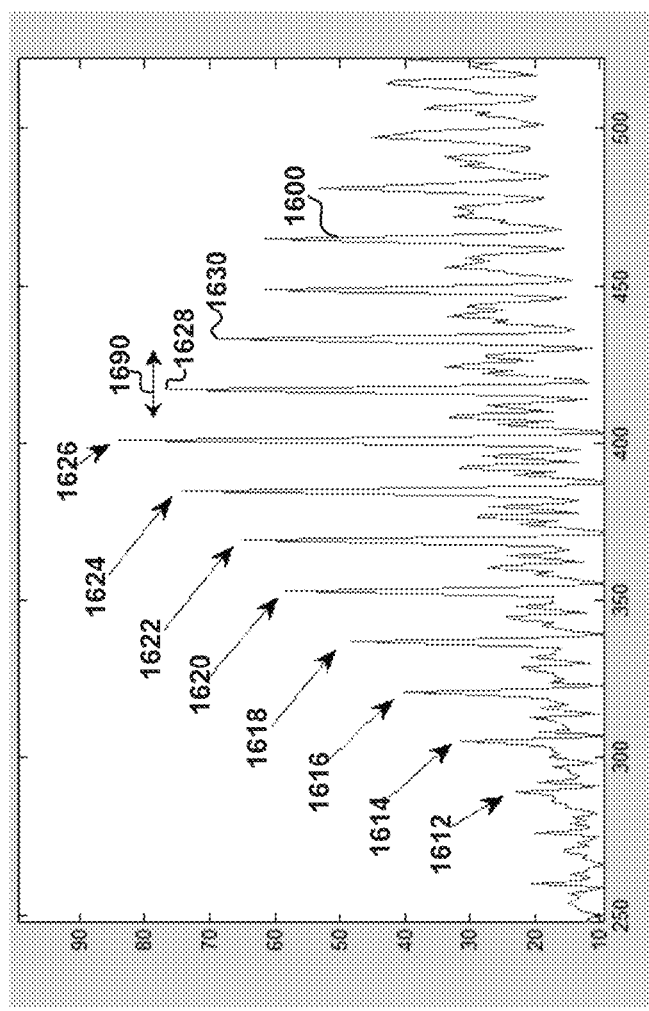

FIG. 16 is a simplified diagram showing certain calculated sums according to yet another embodiment of the present invention.

Figure 17:
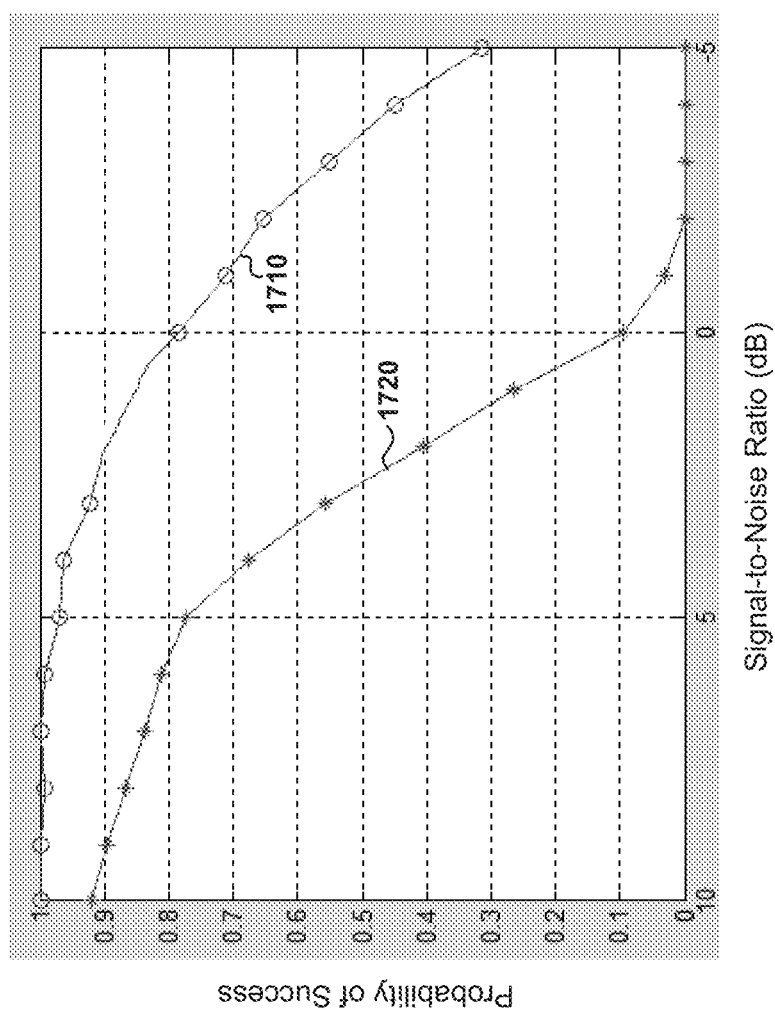

FIG. 17 is a simplified diagram showing comparison of simulated probability of success in symbol synchronization according to one embodiment of the present invention.

5. DETAILED DESCRIPTION OF THE INVENTION

Certain embodiments of the present invention are directed to wireless communication signal processing. More particularly, some embodiments of the invention provide systems and methods for synchronization by transceivers with offset quadrature phase-shift keying (OQPSK) demodulation. Merely by way of example, some embodiments of the invention have been applied to the IEEE 802.15.4 standard. But it would be recognized that the invention has a much broader range of applicability.

FIG. 8 is a simplified diagram showing certain components of a node of an IEEE 802.15.4 network according to one embodiment of the present invention. This diagram is merely an example, which should not unduly limit the scope of the claims. One of ordinary skill in the art would recognize many variations, alternatives, and modifications. The node 800 includes a radio-frequency transceiver 810 and a controller 820. The radio-frequency transceiver 810 includes a receiver 830 and a transmitter 840.

In one embodiment, the receiver 830 receives one or more wireless signals (e.g., a radio-frequency analog signal 914 as shown in FIG. 9) according to the IEEE 802.15.4 standard, and the transmitter 840 sends one or more wireless signals according to the IEEE 802.15.4 standard. For example, the radio-frequency analog signal 914 is a spread-spectrum signal. In another embodiment, additionally, within the node 800, the radio-frequency transceiver 810 communicates with the controller 820. In yet another embodiment, the node 800 represents an electronic device.

FIG. 9 is a simplified diagram showing an offset quadrature phase-shift keying (OQPSK) demodulator as part of the receiver 830 of the radio-frequency transceiver 810 as shown in FIG. 8 according to one embodiment of the present invention. This diagram is merely an example, which should not unduly limit the scope of the claims. One of ordinary skill in the art would recognize many variations, alternatives, and modifications. The OQPSK demodulator 900 includes analog-to-digital converters 910 and 912, a delay and difference module 920, a correlator 930, a storage 940, an adder and storage component 950, a symbol synchronization selection module 960, and a symbol decoder 970. For example, the storage 940 includes a memory (e.g., RAM, EEPROM, and/or Flash memory).

In one embodiment, the analog-to-digital converters 910 and 912 receive a radio-frequency (RF) analog signal 914 that is a spread-spectrum signal. For example, the RF analog spread-spectrum signal 914 is represented by a complex function of time (e.g., r(t)). In another example, the real part of the complex function (e.g., Re[r(t)]) is received by the analog-to-digital converter 910, and the imaginary part of the complex function (e.g., Im[r(t)]) is received by the analog-to-digital converter 912.

In another embodiment, in response, the analog-to-digital converters 910 and 912 output a digital signal 916, which includes an in-phase component (e.g., "I" of the digital signal 916) and a quadrature component (e.g., "Q" of the digital signal 916). For example, the in-phase component of the digital signal 916 is generated by the analog-to-digital converter 910, and the quadrature component of the digital signal 916 is generated by the analog-to-digital converter 912. In another example, as shown in FIG. 9, the delay and difference module 920 receives both the in-phase component and the quadrature component of the digital signal 916.

Figure 10:
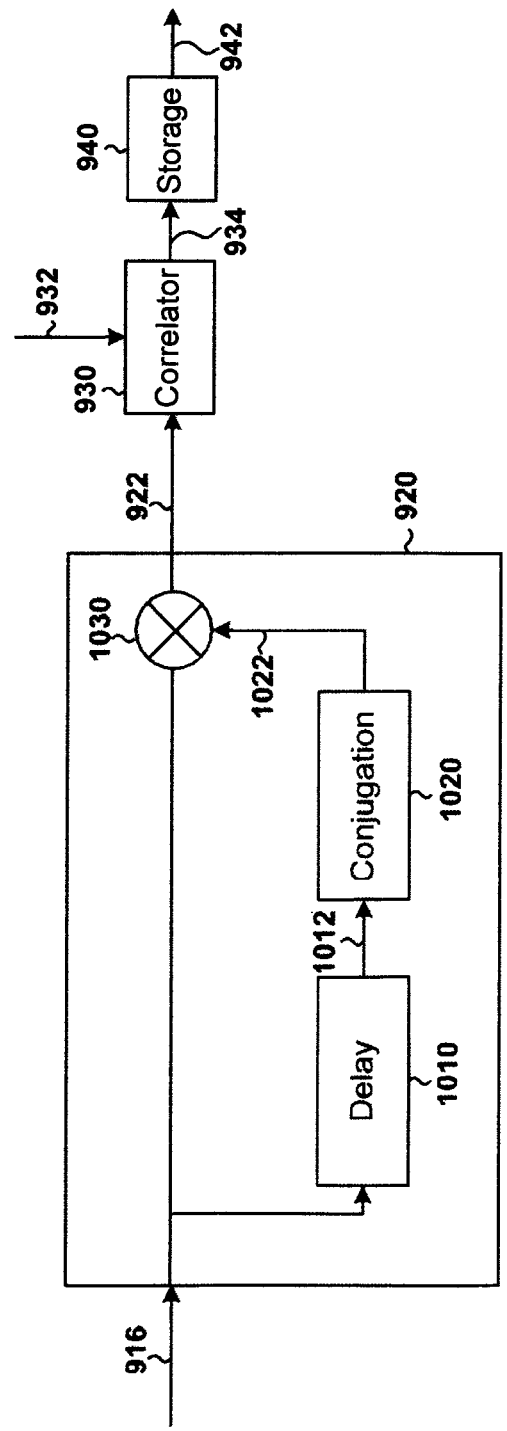
FIG. 10 is a simplified diagram showing certain components of the delay and difference module as part of the offset quadrature phase-shift keying (OQPSK) demodulator of the receiver as shown in FIGS. 8 and 9 according to one embodiment of the present invention.

FIG. 10 is a simplified diagram showing certain components of the delay and difference module 920 as part of the offset quadrature phase-shift keying (OQPSK) demodulator 900 of the receiver 830 as shown in FIGS. 8 and 9 according to one embodiment of the present invention. This diagram is merely an example, which should not unduly limit the scope of the claims. One of ordinary skill in the art would recognize many variations, alternatives, and modifications. The delay and difference module 920 includes a delay component 1010, a conjugation component 1020, and a multiplication component 1030.

In one embodiment, the delay component 1010 receives the digital signal 916 represented by a complex function of time, and generates a delayed digital signal 1012 represented by another complex function of time. For example, the delayed digital signal 1012 is received by the conjugation component 1020, which in response generates a delayed conjugated signal 1022 that is a complex conjugate of the delayed digital signal 1012.

In another embodiment, the multiplication component 1030 receives the delayed conjugated signal 1022 and also receives the digital signal 916 without delay. For example, the digital signal 916 without delay is represented by a complex function of time, and the delayed conjugated signal 1022 is represented by another complex function of time. In another example, the digital signal 916 without delay and the delayed conjugated signal 1022 are multiplied by the multiplication component 1030, which generates a signal 922 that represents the result of the multiplication.

In yet another embodiment, the signal 922 is received by the correlator 930, which also receives a spread-spectrum pseudo-noise (PN) sequence 932. For example, the spread-spectrum PN sequence 932 is the spread-spectrum PN sequence that has been used to generate the RF analog spread-spectrum signal 914.

Figure 11:
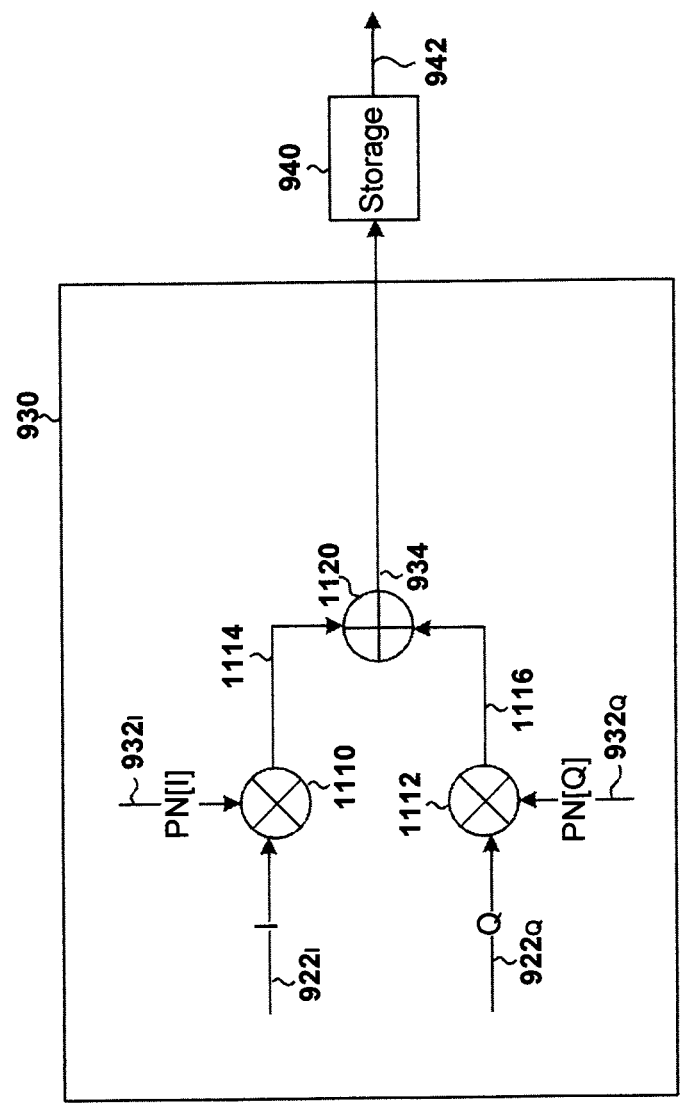
FIG. 11 is a simplified diagram showing certain components of the correlator as part of the offset quadrature phase-shift keying (OQPSK) demodulator of the receiver as shown in FIGS. 8 and 9 according to one embodiment of the present invention.

FIG. 11 is a simplified diagram showing certain components of the correlator 930 as part of the offset quadrature phase-shift keying (OQPSK) demodulator 900 of the receiver 830 as shown in FIGS. 8 and 9 according to one embodiment of the present invention. This diagram is merely an example, which should not unduly limit the scope of the claims. One of ordinary skill in the art would recognize many variations, alternatives, and modifications. The correlator 930 includes multiplication components 1110 and 1112 and an adder 1120.

In one embodiment, the multiplication component 1110 receives an in-phase component of the signal 922 (e.g., "I" of the signal 922 as represented by $922_I$) and an in-phase component of the spread-spectrum PN sequence 932 (e.g., "I" of the sequence 932 as represented by $932_I$). For example, the in-phase component of the signal 922 and the in-phase component of the spread-spectrum PN sequence 932 are multiplied by the multiplication component 1110, which in response outputs a multiplication result 1114 to the adder 1120.

In another embodiment, the multiplication component 1112 receives a quadrature component of the signal 922 (e.g., "Q" of the signal 922 as represented by $922_Q$) and a quadrature component of the spread-spectrum PN sequence 932 (e.g., "Q" of the sequence 932 as represented by $932_Q$).

For example, the quadrature component of the signal 922 and the quadrature component of the spread-spectrum PN sequence 932 are multiplied by the multiplication component 1112, which in response outputs a multiplication result 1116 to the adder 1120.

In yet another embodiment, the adder 1120 receives the multiplication results 1114 and 1116, adds the multiplication results 1114 and 1116, and generates a correlation result 934. For example, as shown in FIG. 9, the correlation result 934 is received by the storage 940. In another example, the storage 940 is coupled to the correlator 930.

Part A of FIG. 12 is a simplified diagram showing certain components of the storage 940 as part of the offset quadrature phase-shift keying (OQPSK) demodulator 900 of the receiver 830 as shown in FIGS. 8 and 9 according to one embodiment of the present invention. This diagram is merely an example, which should not unduly limit the scope of the claims. One of ordinary skill in the art would recognize many variations, alternatives, and modifications. The storage 940 includes 8×N storage units, where N is the length of the spread-spectrum PN sequence that has been used to generate the spread-spectrum signal 914. For example, N depends on frequency band and data transmission rate. In another example, N is equal to sixteen or thirty-two.

In one embodiment, the 8×N storage units of the storage 940 are labeled, sequentially, as "0", "1", "2", "3", . . . , "N", "N+1", . . . , "2×N", "2×N+1", . . . , "7×N", "7× N+1", . . . , and "8×N−1". For example, before the storage 940 receives any correlation result 934, each of the 8×N storage units of the storage 940 stores a default value of zero. In another embodiment, the correlator 930 generates a stream of correlation results 934. For example, the stream of correlation results 934 includes multiple correlation results 934, which have been generated by the correlator 930 one after another. In another example, two closest correlation results 934 of the stream are separated in time by a chip period of the spread-spectrum signal 914.

According to one embodiment, the stream of correlation results 934 generated by the correlator 930 is received by the storage 940. For example, a particular correlation result 934 of the stream first is stored in unit "0" of the storage 940, and then is moved to and stored in the next unit of the storage 940 whenever a later correlation result 934 of the stream enters unit "0" of the storage 940. In another example, as the stream of correlation results 934 enters the storage 940, a particular correlation result 934 of the stream is moved, sequentially, through unit "0", unit "1", unit "2", unit "3", . . . , unit "N", unit "N+1", . . . , unit "2×N", unit "2×N+1", . . . , unit "7×N", unit "7×N+1", . . . , and unit "8×N−1" of the storage 940. In yet another example, after a particular correlation result 934 of the stream has been moved to and stored in unit "8×N−1" of the storage 940, the particular correlation result 934 is then discarded if another later correlation result 934 of the stream enters unit "0" of the storage 940. In yet another example, the storage 940 stores correlation results 934 from the stream of correlation results 934 according to first-in, first-out (FIFO) mechanism.

Parts B and C of FIG. 12 are simplified diagrams showing certain components of the adder and storage component 950 as part of the offset quadrature phase-shift keying (OQPSK) demodulator 900 of the receiver 830 as shown in FIGS. 8 and 9 according to one embodiment of the present invention. These diagrams are merely examples, which should not unduly limit the scope of the claims. One of ordinary skill in the art would recognize many variations, alternatives, and modifications. The adder and storage component 950 includes an adder 1210 and a storage 1220. For example, the adder 1210 and the storage 1220 are coupled to each other. In another example, the adder 1210 is also coupled to the storage 940, and the storage 1220 is also coupled to the symbol synchronization selection module 960. In yet another example, the storage 1220 includes a memory (e.g., RAM, EEPROM, and/or Flash memory).

In one embodiment, as shown in Part B of FIG. 12, the adder 1210 receives multiple values 942 that are stored in selected units of the storage 940. For example, each selected unit of the storage 940 is separated from its closest neighboring selected unit by N−1 units of the storage 940. In another example, the adder 1210 receives multiple values 942 that are stored in unit "0", unit "N", unit "2×N", unit "3×N", unit "4×N", unit "5×N", unit "6×N", and unit "7×N" of the storage 940. In yet another embodiment, as shown in Part C of FIG. 12, the adder 1210 calculates the sum 1212 of the multiple values 942. For example, the multiple values 942 include value $942_0$, $942_N$, $942_{2N}$, $942_{3N}$, $942_{4N}$, $942_{5N}$, $942_{6N}$, and $942_{7N}$, which are stored in unit "0", unit "N", unit "2×N", unit "3×N", unit "4×N", unit "5×N", unit "6×N", and unit "7×N" of the storage 940 respectively. In yet another embodiment, the adder 1210 stores the calculated sum 1212 in the storage 1220. For example, the storage 1220 includes three storage units, labeled as "0", "1", and "2".

According to one embodiment, as the stream of correlation results 934 moves through the storage 940, the adder 1210 generates a stream of calculated sums 1212. For example, two closest calculated sums 1212 of the stream are separated in time by a chip period of the spread-spectrum signal 914.

According to another embodiment, the stream of calculated sums 1212 generated by the adder 1210 is received by the storage 1220. For example, a particular calculated sum 1212 of the stream is first stored in unit "0" of the storage 1220, and is then moved to and stored in the next unit whenever a later calculated sum 1212 of the stream enters unit "0" of the storage 1220. In another example, as the stream of calculated sums 1212 enters the storage 1220, a particular calculated sum 1212 of the stream is moved, sequentially, through unit "0", unit "1", and unit "2" of the storage 1220. In yet another example, after a particular calculated sum 1212 of the stream has been moved to and stored in unit "2" of the storage 1220, the particular calculated sum 1212 is then discarded if another later calculated sum 1212 of the stream enters unit "0" of the storage 1220.

As shown in Part C of FIG. 12, the stream of calculated sums 1212 generated by the adder 1210 moves through the storage 1220 according to certain embodiments. For example, at a given time, three calculated sums 1212 of the stream are stored in unit "0", unit "1", and unit "2" of the storage 1220. In another example, after a chip period of the spread-spectrum signal 914, a new calculated sum 1212 enters into and is stored in unit "0" of the storage 1220, the calculated sum 1212 that was previously stored in unit "0" is moved to and stored in unit "1," the calculated sum 1212 that was previously stored in unit "1" is moved to and stored in unit "2," and the calculated sum 1212 that was previously stored in unit "2" is discarded.

As shown in FIG. 9, the symbol synchronization selection module 960 receives calculated sums 952 that are stored in the adder and storage component 950. For example, at a given time, the calculated sums 952 include three calculated sums 1212 that are stored in unit "0", unit "1", and unit "2" of the storage 1220 of the adder and storage component 950. In another example, for the given time, the symbol synchronization selection module 960 compares the three calculated sums 1212, and determines whether the calculated sum 1212 stored in unit "1" is larger than both of the calculated sums 1212 stored in unit "0" and unit "2" of the storage 1220 of the adder and storage component 950. In yet another example, for the given time, if the calculated sum 1212 stored in unit "1" is larger than both of the calculated sums 1212 stored in unit "0" and unit "2" of the storage 1220 of the adder and storage component 950, the symbol synchronization selection module 960 identifies the calculated sum 1212 stored in unit "1" as a peak.

FIG. 13 is a simplified diagram showing a method performed by the symbol synchronization selection module 960 as part of the offset quadrature phase-shift keying (OQPSK) demodulator 900 of the receiver 830 as shown in FIGS. 8 and 9 according to one embodiment of the present invention. This diagram is merely an example, which should not unduly limit the scope of the claims. One of ordinary skill in the art would recognize many variations, alternatives, and modifications.

The method 1300 includes a process 1310 for receiving a predetermined threshold 964, a process 1320 for identifying a first peak as a present peak, a process 1330 for searching for a next peak within a time window, a process 1340 for setting the next peak as the present peak, a process 1350 for determining whether the peak count is equal to eight, a process 1360 for determining whether the present peak is larger than the predetermined threshold 964, a process 1370 for determining a point of symbol synchronization 962, and a process 1380 for outputting the point of symbol synchronization 962.

At the process 1310, the symbol synchronization selection module 960 receives a predetermined threshold 964 according to certain embodiments. For example, after the process 1310 is completed, the process 1320 is performed.

At the process 1320, the symbol synchronization selection module 960 identifies a first peak as a present peak, which corresponds to a present peak time, and sets a peak count to 1, according to some embodiments. For example, at a given time, the symbol synchronization selection module 960 receives three calculated sums 1212 that are stored in unit "0", unit "1", and unit "2" of the storage 1220 of the adder and storage component 950, compares these three calculated sums 1212, and determines whether, at the given time, the calculated sum 1212 stored in unit "1" is larger than both of the calculated sums 1212 stored in unit "0" and unit "2" of the storage 1220 of the adder and storage component 950. In yet another example, for the given time, if the calculated sum 1212 stored in unit "1" is larger than both of the calculated sums 1212 stored in unit "0" and unit "2" of the storage 1220 of the adder and storage component 950, the symbol synchronization selection module 960 identifies the calculated sum 1212 stored in unit "1" as the present peak that corresponds to the present peak time, sets the peak count to 1, and then performs the process 1330. In yet another example, for the given time, if the calculated sum 1212 stored in unit "1" is not larger than the calculated sum 1212 stored in unit "0" and/or the calculated sum 1212 stored in unit "1" is not larger than the calculated sum 1212 stored in unit "2" of the storage 1220 of the adder and storage component 950, the symbol synchronization selection module 960 repeats the process 1320 at a later time (e.g., at a time that is later than the given time by a chip period of the spread-spectrum signal 914).

At the process 1330, the symbol synchronization selection module 960 searches for a next peak within a time window according to certain embodiments. According to one embodiment, the present peak time has been determined in the process 1320 or the process 1340, and is used to calculate the time window. According to another embodiment, the time window is T+N×P±O, where T represents the present peak time, N is the length of the spread-spectrum PN sequence that has been used to generate the spread-spectrum signal 914, P represents a chip period of the spread-spectrum signal 914, and O represents a predetermined offset. For example, the beginning time of the time window follows the present peak time (e.g., T) by a predetermined time duration (e.g., N×P). In another example, the end time of the time window follows the beginning time of the time window by a second predetermined time duration, which is the width (e.g., 2×O) of the time window. In yet another example, the predetermined offset (e.g., O) is equal to a half width of the time window. In yet another example, the predetermined offset (e.g., O) is equal to 5% of N×P, and the width of the time window is equal to 10% of N×P.

According to yet another embodiment, the symbol synchronization selection module 960 searches for the next peak within the time window by deciding whether at any given time within the time window, the calculated sum 1212 stored in unit "1" is larger than both of the calculated sums 1212 stored in unit "0" and unit "2" of the storage 1220 of the adder and storage component 950. In one embodiment, if, for all the times throughout the entire time window, the calculated sum 1212 stored in unit "1" is not larger than the calculated sum 1212 stored in unit "0" and/or the calculated sum 1212 stored in unit "1" is not larger than the calculated sum 1212 stored in unit "2" of the storage 1220 of the adder and storage component 950, the symbol synchronization selection module 960 then performs the process 1350.

In another embodiment, if, for a given time within the time window, the calculated sum 1212 stored in unit "1" is larger than both of the calculated sums 1212 stored in unit "0" and unit "2" of the storage 1220 of the adder and storage component 950, the symbol synchronization selection module 960 identifies the calculated sum 1212 stored in unit "1" as the next peak, and then determines whether the next peak is larger than the present peak that has been determined in the process 1320 or the process 1340. For example, the next peak corresponds to a next peak time. In another example, if the next peak is larger than the present peak, the symbol synchronization selection module 960 then performs the process 1340. In yet another example, if the next peak is not larger than the present peak, the symbol synchronization selection module 960 then performs the process 1350.

At the process 1340, the symbol synchronization selection module 960 sets the next peak as identified in the process 1330 as the present peak, and increase the peak count by 1, according to some embodiments. For example, at the process 1340, the symbol synchronization selection module 960 also makes the next peak time become the present peak time. In another example, after the process 1340 is completed, the process 1330 is again performed.

At the process 1350, the symbol synchronization selection module 960 determines whether the peak count is equal to eight, according to certain embodiments. For example, if the peak count is equal to eight, the process 1360 is then performed. In another example, if the peak count is not equal to eight, the process 1320 is then performed in order to identify another first peak as the present peak and sets the peak count to 1.

At the process 1360, the symbol synchronization selection module 960 determines whether the present peak is larger than the predetermined threshold 964, according to some embodiments. For example, if the present peak is larger than the predetermined threshold 964, the process 1370 is then performed. In another example, if the present peak is not larger than the predetermined threshold 964, the process 1320 is then performed in order to identify another first peak as the present peak and sets the peak count to 1.

At the process 1370, the symbol synchronization selection module 960 determines a point of symbol synchronization 962 according to certain embodiments. For example, the point of symbol synchronization 962 corresponds to a chip of the spread-spectrum signal 914, and the chip of the spread-spectrum signal 914 is used to generate the correlation result 934 stored in unit "0" of the storage 940, which has been used to determine the calculated sum 1212 that has been stored in unit "1" of the storage 1220 of the adder and storage component 950 and has been identified as the present peak when the peak count is increased to 8. In another example, the point of symbol synchronization 962 represents the end of a preamble section of a frame.

At the process 1380, the symbol synchronization selection module 960 outputs the point of symbol synchronization 962 to the symbol decoder 970 as shown in FIG. 9, according to some embodiments. As shown in FIG. 9, the symbol decoder 970 receives the point of symbol synchronization 962, uses the point of symbol synchronization 962 as an indication for the end of the preamble section of the frame, decodes the spread-spectrum signal 914 to obtain information as contained in the frame, and outputs obtained information as a signal 972, according to certain embodiments.

As discussed above and further emphasized here, FIG. 13 is merely an example, which should not unduly limit the scope of the claims. One of ordinary skill in the art would recognize many variations, alternatives, and modifications. In one embodiment, the process 1350 is modified such that at the process 1350, the symbol synchronization selection module 960 determines whether the peak count is equal to K, where K is a predetermined positive integer. For example, if the peak count is equal to K, the process 1360 is then performed. In another example, if the peak count is not equal to K, the process 1320 is then performed in order to identify another first peak as the present peak and sets the peak count to 1. In another embodiment, the process 1350 is modified such that at the process 1350, the symbol synchronization selection module 960 determines whether the peak count is larger than or equal to K, where K is a predetermined positive integer. For example, if the peak count is larger than or equal to K, the process 1360 is then performed. In another example, if the peak count is smaller than K, the process 1320 is then performed in order to identify another first peak as the present peak and sets the peak count to 1.

FIG. 14A is a simplified diagram showing certain correlation results 934 according to one embodiment of the present invention, and FIG. 14B is a simplified diagram showing certain calculated sums 1212 according to one embodiment of the present invention. These diagrams are merely examples, which should not unduly limit the scope of the claims. One of ordinary skill in the art would recognize many variations, alternatives, and modifications.

In one embodiment, as shown in FIG. 14A, a waveform 1410 represents correlation results 934 according to the sequence of time when the correlation results 934 are generated by the correlator 930. For example, the $1500^{th}$ correlation result 934 corresponds to an earlier chip of the spread-spectrum signal 914 that has been used to generate the $1500^{th}$ correlation result 934, and the $2200^{th}$ correlation result 934 corresponds to a later chip of the spread-spectrum signal 914 that has been used to generate the $2200^{th}$ correlation result 934. In another example, the waveform 1410 represents a stream of correlation results 934 that is generated by the correlator 930.

In another embodiment, as shown in FIG. 14B, a waveform 1420 represents calculated sums 1212 according to the sequence of time when the calculated sums 1212 are generated by the adder 1210 of the adder and storage component 950. For example, the $1000^{th}$ calculated sum 1212 corresponds to an earlier chip of the spread-spectrum signal 914, and the earlier chip of the spread-spectrum signal 914 is used to generate the correlation result 934 stored in unit "0" of the storage 940, which has been used to determine the $1000^{th}$ calculated sum 1212. In another example, the $2500^{th}$ calculated sum 1212 corresponds to a later chip of the spread-spectrum signal 914, and the later chip of the spread-spectrum signal 914 is used to generate the correlation result 934 stored in unit "0" of the storage 940, which has been used to determine the $2500^{th}$ calculated sum 1212. In yet another example, the waveform 1420 represents a stream of calculated sums 1212 that is generated by the adder 1210 of the adder and storage component 950.

As shown in FIGS. 14A and 14B, as the stream of correlation results 934 enters and moves through the storage 940, the stream of calculated sums 1212 is generated by the adder 1210 of the adder and storage component 950 according to certain embodiments. For example, the stream of calculated sums 1212 provides better accuracy than the stream of correlation results 934. In another example, the stream of calculated sums 1212 provides higher signal-to-noise ratio than the stream of correlation results 934.

FIG. 15A is a simplified diagram showing certain calculated sums 1212 according to one embodiment of the present invention, FIG. 15B is a simplified diagram showing certain calculated sums 1212 according to another embodiment of the present invention, and FIG. 15C is a simplified diagram showing certain calculated sums 1212 according to yet another embodiment of the present invention. These diagrams are merely examples, which should not unduly limit the scope of the claims. One of ordinary skill in the art would recognize many variations, alternatives, and modifications.

In one embodiment, as shown in FIG. 15A, a waveform 1510 represents calculated sums 1212 according to the sequence of time when the calculated sums 1212 are generated by the adder 1210 of the adder and storage component 950, and the calculated sums 1212 are stored sequentially by unit "1" of the storage 1220 of the adder and storage component 950, where unit "1" of the storage 1220 of the adder and storage component 950 stores only one calculated sum 1212 at a given time. For example, at the process 1320, a first peak 1562 is identified as the present peak, and the peak count is set to 1. In another example, at the process 1330, the symbol synchronization selection module 960 identifies a second peak 1564 as the next peak during a time window 1590 and determines that the next peak 1564 is larger than the present peak 1562; and at the process 1340, the symbol synchronization selection module 960 sets the next peak 1564 as the present peak and also increases the peak count to 2.

In another embodiment, as shown in FIG. 15B, a waveform 1520 represents calculated sums 1212 according to the sequence of time when the calculated sums 1212 are generated by the adder 1210 of the adder and storage component 950, and the calculated sums 1212 are stored sequentially by unit "1" of the storage 1220 of the adder and storage component 950, where unit "1" of the storage 1220 of the adder and storage component 950 stores only one calculated sum 1212 at a given time. For example, at the process 1340, the symbol synchronization selection module 960 sets the next peak 1564 as the present peak and also increases the peak count to 2; at the process 1330, the symbol synchronization selection module 960 identifies a third peak 1566 as the next peak during a time window 1592 and determines that the next peak 1566 is larger than the present peak 1564; and at the process 1340, the symbol synchronization selection module 960 sets the next peak 1566 as the present peak and also increases the peak count to 3.

In yet another embodiment, as shown in FIG. 15C, a waveform 1530 represents calculated sums 1212 according to the sequence of time when the calculated sums 1212 are generated by the adder 1210 of the adder and storage component 950, and the calculated sums 1212 are stored sequentially by unit "1" of the storage 1220 of the adder and storage component 950, where unit "1" of the storage 1220 of the adder and storage component 950 stores only one calculated sum 1212 at a given time. For example, at the process 1340, the symbol synchronization selection module 960 sets the next peak 1566 as the present peak and also increases the peak count to 3; at the process 1330, the symbol synchronization selection module 960 identifies a fourth peak 1568 as the next peak during a time window 1594 and determines that the next peak 1568 is not larger than the present peak 1566; at the process 1350, the symbol synchronization selection module 960 determines that the peak count is not equal to 8; and at the process 1320, another first peak 1570 is identified as the present peak, and the peak count is set to 1.

According to one embodiment, the time window 1590, the time window 1592, and the time window 1594 are equal in duration. According to another embodiment, the time window 1590, the time window 1592, and the time window 1594 are not equal in duration.

FIG. 16 is a simplified diagram showing certain calculated sums 1212 according to yet another embodiment of the present invention. This diagram is merely an example, which should not unduly limit the scope of the claims. One of ordinary skill in the art would recognize many variations, alternatives, and modifications.

As shown in FIG. 16, a waveform 1600 represents calculated sums 1212 according to the sequence of time when the calculated sums 1212 are generated by the adder 1210 of the adder and storage component 950, and the calculated sums 1212 are stored sequentially by unit "1" of the storage 1220 of the adder and storage component 950, where unit "1" of the storage 1220 of the adder and storage component 950 stores only one calculated sum 1212 at a given time, according to certain embodiments.

For example, while performing the method 1300, the symbol synchronization selection module 960 identifies, sequentially, peaks 1612, 1614, 1616, 1618, 1620, 1622, 1624, and 1626 as the present peak respectfully, and increases the peak count, one by one, from 1 to 8.

In another example, at the process 1330, the symbol synchronization selection module 960 identifies a ninth peak 1628 as the next peak during a time window 1690 and determines that the next peak 1628 is not larger than the present peak 1626; at the process 1350, the symbol synchronization selection module 960 determines that the peak count is equal to 8; and at the process 1360, the symbol synchronization selection module 960 determines whether the present peak 1626 is larger than the predetermined threshold 964.

In yet another example, if at the process 1360, the symbol synchronization selection module 960 determines that the present peak 1626 is larger than the predetermined threshold 964, then at the process 1370, the symbol synchronization selection module 960 determines the point of symbol synchronization 962; and at the process 1380, the symbol synchronization selection module 960 outputs the point of symbol synchronization 962 to the symbol decoder 970 as shown in FIG. 9. In yet another example, if at the process 1360, the symbol synchronization selection module 960 determines that the present peak 1626 is not larger than the predetermined threshold 964, then at the process 1320, another first peak 1630 is identified as the present peak, and the peak count is set to 1.

FIG. 17 is a simplified diagram showing comparison of simulated probability of success in symbol synchronization according to one embodiment of the present invention. This diagram is merely an example, which should not unduly limit the scope of the claims. One of ordinary skill in the art would recognize many variations, alternatives, and modifications. A waveform 1710 represents the simulated probability of success in symbol synchronization as a function of signal-to-noise ratio by the method 1300, and a waveform 1720 represents the simulated probability of success in symbol synchronization as a function of signal-to-noise ratio by the method 700.

In one embodiment, for the same signal-to-noise ratio, the simulated probability of success in symbol synchronization by the method 1300 (e.g., as shown by the waveform 1710) is significantly higher than the simulated probability of success in symbol synchronization by the method 700 (e.g., as shown by the waveform 1720). In another embodiment, if the signal-to-noise ratio is small, the simulated probability of success in symbol synchronization by the method 700 can drop to zero (e.g., as shown by the waveform 1720), but in contrast, the simulated probability of success in symbol synchronization by the method 1300 remains larger than or equal to 30% (e.g., as shown by the waveform 1710).

Certain embodiments of the present invention provide a synchronization method for an offset quadrature phase-shift keying (OQPSK) demodulator as part of a receiver of a radio-frequency transceiver under the IEEE 802.15.4 standard. For example, the synchronization method includes adding multiple correlation results to generate multiple calculated sums, identifying multiple peaks during predetermined time windows based on the multiple calculated sums, and determining a point of symbol synchronization based on the identified multiple peaks. In another example, the synchronization method improves accuracy of synchronization for the same signal-to-noise ratio.

According to another embodiment, a demodulator (e.g., the demodulator 900) for processing an analog signal (e.g., the radio-frequency analog spread-spectrum signal 914) includes one or more analog-to-digital converters (e.g., the analog-to-digital converters 910 and 912) configured to receive an analog signal (e.g., the radio-frequency analog spread-spectrum signal 914) and generate a digital signal (e.g., the digital signal 916) based at least in part on the analog signal, and a correlator (e.g., the correlator 930) coupled to the one or more analog-to-digital converters and configured to generate a stream of correlation results including a first plurality of correlation results (e.g., a first plurality of correlation results 934), a second plurality of correlation results (e.g., a second plurality of correlation results 934), and a third plurality of correlation results (e.g., a third plurality of correlation results 934). The first plurality of correlation results is different from the second plurality of correlation results by at least one correlation result, and the second plurality of correlation results is different from the third plurality of correlation results by at least another correlation result. Additionally, the demodulator (e.g., the demodulator 900) includes an adder (e.g., the adder 1210) coupled to the correlator (e.g., the correlator 930) and configured to receive first selected correlation results (e.g., the multiple values 942) of the first plurality of correlation results and determine a first sum (e.g., the sum 1212) of the first selected correlation results, receive second selected correlation results of the second plurality of correlation results and determine a second sum of the second selected correlation results, and receive third selected correlation results of the third plurality of correlation results and determine a third sum of the third selected correlation results. Moreover, the demodulator (e.g., the demodulator 900) includes a first storage (e.g., the storage 1220) configured to receive and store the first sum at a first time, receive and store the second sum at a second time, and receive and store the third sum at a third time. The first time precedes the second time, and the second time precedes the third time. Also, the demodulator (e.g., the demodulator 900) includes a symbol synchronization selector (e.g., the symbol synchronization selection module 960) coupled to the first storage and configured to determine a point of symbol synchronization (e.g., the point of symbol synchronization 962) based at least in part on the first sum, the second sum and the third sum. For example, the demodulator is implemented according to at least FIG. 9 and/or FIG. 12.

In another example, the demodulator (e.g., the demodulator 900) further includes a second storage (e.g., the storage 940) configured to receive the stream of correlation results, store the first plurality of correlation results at a fourth time, store the second plurality of correlation results at a fifth time, and store the third plurality of correlation results at a sixth time. In yet another example, the fourth time precedes the fifth time, and the fifth time precedes the sixth time. In yet another example, the fourth time precedes the second time, and the fifth time precedes the third time. In yet another example, the adder (e.g., the adder 1210) is coupled to the correlator (e.g., the correlator 930) through the second storage (e.g., the storage 940).

In yet another example, the demodulator (e.g., the demodulator 900) further includes a symbol decoder (e.g., the symbol decoder 970) configured to receive the point of symbol synchronization (e.g., the point of symbol synchronization 962) and decode the analog signal (e.g., the radio-frequency analog spread-spectrum signal 914) based at least in part on the point of symbol synchronization. In yet another example, the symbol decoder (e.g., the symbol decoder 970) is further configured to generate an output signal (e.g., the signal 972) based on at least information associated with the analog signal (e.g., the radio-frequency analog spread-spectrum signal 914). In yet another example, the correlator is coupled to the one or more analog-to-digital converters through a component (e.g., the delay and difference module 920).

In yet another example, the adder (e.g., the adder 1210) is one part of a component (e.g., the adder and storage component 950), and the first storage (e.g., the storage 1220) is another part of the component (e.g., the adder and storage component 950). In yet another example, the one or more analog-to-digital converters include a first analog-to-digital converter (e.g., the analog-to-digital converter 910) and a second analog-to-digital converter (e.g., the analog-to-digital converter 912).

In yet another example, the correlator (e.g., the correlator 930) is further configured to receive a spread-spectrum pseudo-noise sequence (e.g., the spread-spectrum PN sequence 932) and generate the stream of correlation results based at least in part on the spread-spectrum pseudo-noise sequence. In yet another example, the spread-spectrum pseudo-noise sequence (e.g., the spread-spectrum PN sequence 932) is used to generate the analog signal (e.g., the radio-frequency analog spread-spectrum signal 914). In yet another example, the symbol synchronization selector (e.g., the symbol synchronization selection module 960) is further configured to receive a predetermined threshold (e.g., the predetermined threshold 964) and determine the point of symbol synchronization (e.g., the point of symbol synchronization 962) based at least in part on the first sum, the second sum, the third sum, and the predetermined threshold.

According to yet another embodiment, a demodulator (e.g., the demodulator 900) for processing an analog signal (e.g., the radio-frequency analog spread-spectrum signal 914) includes a correlation result generator configured to receive an analog signal (e.g., the radio-frequency analog spread-spectrum signal 914) and generate a stream of correlation results based at least in part on the analog signal. The stream of correlation results includes a first plurality of correlation results (e.g., a first plurality of correlation results 934), a second plurality of correlation results (e.g., a second plurality of correlation results 934), and a third plurality of correlation results (e.g., a third plurality of correlation results 934). The first plurality of correlation results is different from the second plurality of correlation results by at least one correlation result, and the second plurality of correlation results is different from the third plurality of correlation results by at least another correlation result. Additionally, the demodulator (e.g., the demodulator 900) includes an adder (e.g., the adder 1210) coupled to the correlation result generator and configured to receive first selected correlation results (e.g., the multiple values 942) of the first plurality of correlation results and determine a first sum (e.g., the sum 1212) of the first selected correlation results, receive second selected correlation results of the second plurality of correlation results and determine a second sum of the second selected correlation results, and receive third selected correlation results of the third plurality of correlation results and determine a third sum of the third selected correlation results. Moreover, the demodulator (e.g., the demodulator 900) includes a symbol synchronization selector (e.g., the symbol synchronization selection module 960) coupled to the adder (e.g., the adder 1210) and configured to compare the first sum, the second sum, and the third sum and to determine a point of symbol synchronization (e.g., the point of symbol synchronization 962) based at least in part on the first sum, the second sum and the third sum. The symbol synchronization selector is further configured to, if the second sum is larger than the first sum and the third sum, determine the second sum being a present peak corresponding to a present peak time and search for a next peak within a time window. The time window starts at a beginning time and ends at an end time. The beginning time follows the present peak time by a first predetermined time duration, and the end time follows the beginning time by a second predetermined time duration. For example, the demodulator is implemented according to at least FIG. 9, FIG. 12, and/or FIG. 13.

In another example, the correlation result generator includes on or more analog-to-digital converters (e.g., the analog-to-digital converters 910 and 912), and a correlator (e.g., the correlator 930) coupled to the one or more analog-to-digital converters through a component (e.g., the delay and difference module 920). In yet another example, the demodulator (e.g., the demodulator 900) further includes a first storage (e.g., the storage 940). The adder (e.g., the adder 1210) is coupled to the correlation result generator through the first storage. In yet another example, the demodulator (e.g., the demodulator 900) further includes a second storage (e.g., the storage 1220). The symbol synchronization selector (e.g., the symbol synchronization selection module 960) is coupled to the adder (e.g., the adder 1210) through the second storage. In yet another example, the demodulator (e.g., the demodulator 900) further includes a symbol decoder (e.g., the symbol decoder 970). The symbol decoder is configured to receive the point of symbol synchronization (e.g., the point of symbol synchronization 962) and decode the analog signal (e.g., the radio-frequency analog spread-spectrum signal 914) based at least in part on the point of symbol synchronization.

According to yet another embodiment, a demodulator (e.g., the demodulator 900) for processing an analog signal (e.g., the radio-frequency analog spread-spectrum signal 914) includes a correlation result generator configured to receive an analog signal (e.g., the radio-frequency analog spread-spectrum signal 914) and generate a stream of correlation results based at least in part on the analog signal. The stream of correlation results includes a first plurality of correlation results (e.g., a first plurality of correlation results 934), a second plurality of correlation results (e.g., a second plurality of correlation results 934), and a third plurality of correlation results (e.g., a third plurality of correlation results 934). The first plurality of correlation results is different from the second plurality of correlation results by at least one correlation result, and the second plurality of correlation results is different from the third plurality of correlation results by at least another correlation result. Additionally, the demodulator (e.g., the demodulator 900) includes an adder (e.g., the adder 1210) coupled to the correlation result generator and configured to receive first selected correlation results (e.g., the multiple values 942) of the first plurality of correlation results and determine a first sum (e.g., the sum 1212) of the first selected correlation results, receive second selected correlation results of the second plurality of correlation results and determine a second sum of the second selected correlation results, and receive third selected correlation results of the third plurality of correlation results and determine a third sum of the third selected correlation results. Moreover, the demodulator (e.g., the demodulator 900) includes a symbol synchronization selector (e.g., the symbol synchronization selection module 960) coupled to the adder (e.g., the adder 1210) and configured to determine a point of symbol synchronization (e.g., the point of symbol synchronization 962). The symbol synchronization selector is further configured to determine a present peak corresponding to a present peak time and corresponding to a first value of a peak count, and compare the first sum, the second sum, and the third sum. Additionally, the symbol synchronization selector is further configured to, if the second sum is not larger than the first sum or the third sum or is not larger than the first sum and the third sum, determine whether the first value is equal to a first predetermined value. Moreover, the symbol synchronization selector is further configured to, if the second sum is larger than the first sum and the third sum: set the second sum to be a next peak corresponding to a next peak time, determine whether the next peak is larger than the present peak, and if the next peak is not larger than the present peak, determine whether the first value is equal to the first predetermined value. For example, the demodulator is implemented according to at least FIG. 9, FIG. 12, and/or FIG. 13.

In another example, the symbol synchronization selector is further configured to, if the first value is equal to the first predetermined value, determine the point of symbol synchronization based on at least information associated with the present peak. In yet another example, the demodulator (e.g., the demodulator 900) includes a symbol decoder (e.g., the symbol decoder 970). The symbol decoder is configured to receive the point of symbol synchronization (e.g., the point of symbol synchronization 962), and decode the analog signal (e.g., the radio-frequency analog spread-spectrum signal 914) based at least in part on the point of symbol synchronization.

In yet another example, the symbol synchronization selector is further configured to, if the first value is not equal to the first predetermined value, make the peak count equal to a second predetermined value. In yet another example, the first predetermined value is equal to eight, and the second predetermined value is equal to one. In yet another example, the symbol synchronization selector is further configured to, if the next peak is larger than the present peak, make the next peak become the present peak, make the next peak time become the present peak time, and change the peak count from the first value to a second value. In yet another example, the second value is equal to the first value plus one.

In yet another example, the correlation result generator includes one or more analog-to-digital converters (e.g., the analog-to-digital converters 910 and 912); and a correlator (e.g., the correlator 930) coupled to the one or more analog-to-digital converters through a component (e.g., the delay and difference module 920). In yet another example, the demodulator (e.g., the demodulator 900) further includes a first storage (e.g., the storage 940). The adder (e.g., the adder 1210) is coupled to the correlation result generator through the first storage. In yet another example, the demodulator (e.g., the demodulator 900) further includes a second storage (e.g., the storage 1220). The symbol synchronization selector (e.g., the symbol synchronization selection module 960) is coupled to the adder (e.g., the adder 1210) through the second storage.

According to yet another embodiment, a method for processing an analog signal (e.g., the radio-frequency analog spread-spectrum signal 914) includes receiving an analog signal (e.g., the radio-frequency analog spread-spectrum signal 914), generating a digital signal (e.g., the digital signal 916) based at least in part on the analog signal, processing information associated with the digital signal (e.g., the digital signal 916), and generating a stream of correlation results based on at least information associated with the digital signal (e.g., the digital signal 916). The stream of correlation results includes a first plurality of correlation results (e.g., a first plurality of correlation results 934), a second plurality of correlation results (e.g., a second plurality of correlation results 934), and a third plurality of correlation results (e.g., a third plurality of correlation results 934). The first plurality of correlation results is different from the second plurality of correlation results by at least one correlation result, and the second plurality of correlation results is different from the third plurality of correlation results by at least another correlation result. Additionally, the method includes receiving first selected correlation results (e.g., the multiple values 942) of the first plurality of correlation results, determining a first sum (e.g., the sum 1212) of the first selected correlation results, receiving second selected correlation results of the second plurality of correlation results, determining a second sum of the second selected correlation results, receiving third selected correlation results of the third plurality of correlation results, and determining a third sum of the third selected correlation results. Additionally, the method includes receiving and storing the first sum at a first time, receiving and storing the second sum at a second time, and receiving and storing the third sum at a third time. The second time follows the first time, and the third time follows the second time. Moreover, the method includes processing information associated with the first sum, the second sum, and the third sum, and determining a point of symbol synchronization (e.g., the point of symbol synchronization 962) based at least in part on the first sum, the second sum and the third sum. For example, the method is implemented according to at least FIG. 9 and/or FIG. 12.

According to yet another embodiment, a method for processing an analog signal (e.g., the radio-frequency analog spread-spectrum signal 914) includes receiving an analog signal (e.g., the radio-frequency analog spread-spectrum signal 914), and generating a stream of correlation results based at least in part on the analog signal. The stream of correlation results includes a first plurality of correlation results (e.g., a first plurality of correlation results 934), a second plurality of correlation results (e.g., a second plurality of correlation results 934), and a third plurality of correlation results (e.g., a third plurality of correlation results 934). The first plurality of correlation results is different from the second plurality of correlation results by at least one correlation result, and the second plurality of correlation results is different from the third plurality of correlation results by at least another correlation result. Additionally, the method includes receiving first selected correlation results (e.g., the multiple values 942) of the first plurality of correlation results, determining a first sum (e.g., the sum 1212) of the first selected correlation results, receiving second selected correlation results of the second plurality of correlation results, determining a second sum of the second selected correlation results, receiving third selected correlation results of the third plurality of correlation results, and determining a third sum of the third selected correlation results. Moreover, the method includes comparing the first sum, the second sum, and the third sum, and determining a point of symbol synchronization (e.g., the point of symbol synchronization 962) based at least in part on the first sum, the second sum and the third sum. The determining a point of symbol synchronization based at least in part on the first sum, the second sum and the third sum includes if the second sum is larger than the first sum and the third sum, determining the second sum being a present peak corresponding to a present peak time and searching for a next peak within a time window. The time window starts at a beginning time and ends at an end time. The beginning time follows the present peak time by a first predetermined time duration, and the end time follows the beginning time by a second predetermined time duration. For example, the method is implemented according to at least FIG. 9, FIG. 12, and/or FIG. 13.

According to yet another embodiment, a method for processing an analog signal (e.g., the radio-frequency analog spread-spectrum signal 914) includes receiving an analog signal (e.g., the radio-frequency analog spread-spectrum signal 914), and generating a stream of correlation results based at least in part on the analog signal. The stream of correlation results includes a first plurality of correlation results (e.g., a first plurality of correlation results 934), a second plurality of correlation results (e.g., a second plurality of correlation results 934), and a third plurality of correlation results (e.g., a third plurality of correlation results 934). The first plurality of correlation results is different from the second plurality of correlation results by at least one correlation result, and the second plurality of correlation results is different from the third plurality of correlation results by at least another correlation result. Additionally, the method includes receiving first selected correlation results (e.g., the multiple values 942) of the first plurality of correlation results, determining a first sum (e.g., the sum 1212) of the first selected correlation results, receiving second selected correlation results of the second plurality of correlation results, determining a second sum of the second selected correlation results, receiving third selected correlation results of the third plurality of correlation results, and determining a third sum of the third selected correlation results. Moreover, the method includes processing information associated with the first sum, the second sum, and the third sum, and determining a point of symbol synchronization (e.g., the point of symbol synchronization 962). The determining a point of symbol synchronization includes determining a present peak corresponding to a present peak time and corresponding to a first value of a peak count, and comparing the first sum, the second sum, and the third sum. Additionally, the determining a point of symbol synchronization includes, if the second sum is not larger than the first sum or the third sum or is not larger than the first sum and the third sum, determining whether the first value is equal to a first predetermined value. Moreover, the determining a point of symbol synchronization includes, if the second sum is larger than the first sum and the third sum: setting the second sum to be a next peak corresponding to a next peak time, determining whether the next peak is larger than the present peak, and if the next peak is not larger than the present peak, determining whether the first value is equal to the first predetermined value. For example, the method is implemented according to at least FIG. 9, FIG. 12, and/or FIG. 13.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A demodulator for processing an analog signal, the demodulator comprising:
   a correlation result generator configured to receive the analog signal and generate a stream of correlation results based at least in part on the analog signal, the stream of correlation results including a first plurality of correlation results, a second plurality of correlation results, and a third plurality of correlation results, the first plurality of correlation results being different from the second plurality of correlation results by at least one correlation result, the second plurality of correlation results being different from the third plurality of correlation results by at least another correlation result;

an adder coupled to the correlation result generator and
configured to receive first selected correlation results of
the first plurality of correlation results and determine a
first sum of the first selected correlation results, receive
second selected correlation results of the second plurality of correlation results and determine a second sum
of the second selected correlation results, and receive
third selected correlation results of the third plurality of
correlation results and determine a third sum of the
third selected correlation results;
a first storage configured to receive and store the first sum
at a first time, receive and store the second sum at a
second time, and receive and store the third sum at a
third time, the first time preceding the second time, the
second time preceding the third time; and
a symbol synchronization selector coupled to the first
storage and configured to determine a point of symbol
synchronization;
wherein the symbol synchronization selector is further
configured to:
  determine a present peak corresponding to a present
peak time;
set a peak count equal to a first positive integer;
compare the first sum, the second sum, and the third sum;
if the second sum is not larger than the first sum or the
third sum or if the second sum is not larger than the first
sum and the third sum,
  determine whether the first positive integer is equal to
a first predetermined positive integer; and
  if the first positive integer is equal to the first predetermined positive integer,
    determine whether the present peak is larger than a
predetermined threshold; and
    if the present peak is larger than the predetermined
threshold, determine the point of symbol synchronization based on at least information associated
with the present peak; and
if the second sum is larger than the first sum and the third
sum,
  set the second sum to be a next peak corresponding to
a next peak time;
  determine whether the next peak is larger than the
present peak;
  if the next peak is not larger than the present peak,
    determine whether the first positive integer is equal
to the first predetermined positive integer; and
    if the first positive integer is equal to the first
predetermined positive integer,
      determine whether the present peak is larger than
the predetermined threshold; and
      if the present peak is larger than the predetermined
threshold, determine the point of symbol synchronization based on at least information associated with the present peak; and
  if the next peak is larger than the present peak,
    make the next peak become the present peak;
    make the next peak time become the present peak
time; and
    change the peak count from the first positive integer
to a second positive integer equal to a sum of the
first positive integer and one.

2. The demodulator of claim 1, and further comprising:
a symbol decoder;
wherein the symbol decoder is configured to:
  receive the point of symbol synchronization; and
  decode the analog signal based at least in part on the
point of symbol synchronization.

3. The demodulator of claim 2 wherein the symbol
decoder is further configured to generate an output signal
based on at least information associated with the analog
signal.

4. The demodulator of claim 1 wherein the symbol
synchronization selector is further configured to,
  if the second sum is larger than the first sum and the third
sum,
    if the next peak is not larger than the present peak,
      if the first positive integer is not equal to the first
predetermined positive integer,
        make the peak count equal to a second predetermined positive integer.

5. The demodulator of claim 4 wherein:
the first predetermined positive integer is equal to eight;
and
the second predetermined positive integer is equal to one.

6. The demodulator of claim 1 wherein the correlation
result generator includes:
one or more analog-to-digital converters; and
a correlator coupled to the one or more analog-to-digital
converters through a component.

7. The demodulator of claim 1, and further comprising:
a second storage;
wherein the symbol synchronization selector is coupled to
the first storage through the second storage.

8. The demodulator of claim 1 wherein:
the adder is one part of a component; and
the first storage is another part of the component.

9. The demodulator of claim 1 wherein the correlation
result generator is further configured to receive a spread-spectrum pseudo-noise sequence and generate the stream of
correlation results based at least in part on the spread-spectrum pseudo-noise sequence.

10. The demodulator of claim 9 wherein the spread-spectrum pseudo-noise sequence is used to generate the
analog signal.

11. A method for processing an analog signal, the method
comprising:
receiving an analog signal;
generating a stream of correlation results based at least in
part on the analog signal, the stream of correlation
results including a first plurality of correlation results,
a second plurality of correlation results, and a third
plurality of correlation results, the first plurality of
correlation results being different from the second
plurality of correlation results by at least one correlation result, the second plurality of correlation results
being different from the third plurality of correlation
results by at least another correlation result;
receiving first selected correlation results of the first
plurality of correlation results;
determining a first sum of the first selected correlation
results;
receiving second selected correlation results of the second
plurality of correlation results;
determining a second sum of the second selected correlation results;
receiving third selected correlation results of the third
plurality of correlation results;
determining a third sum of the third selected correlation
results;
processing information associated with the first sum, the
second sum, and the third sum; and
determining a point of symbol synchronization;
wherein the determining a point of symbol synchronization includes:

determining a present peak corresponding to a present peak time;

setting a peak count equal to a first positive integer;

comparing the first sum, the second sum, and the third sum;

if the second sum is not larger than the first sum or the third sum or the second sum is not larger than the first sum and the third sum, determining whether the first positive integer is equal to a first predetermined positive integer; and if the first positive integer is equal to the first predetermined positive integer, determining whether the present peak is larger than a predetermined threshold; and if the present peak is larger than the predetermined threshold, determining the point of symbol synchronization based on at least information associated with the present peak; and if the second sum is larger than the first sum and the third sum, setting the second sum to be a next peak corresponding to a next peak time;

determining whether the next peak is larger than the present peak;

if the next peak is not larger than the present peak, determining whether the first positive integer is equal to the first predetermined positive integer; and if the first positive integer is equal to the first predetermined positive integer, determining whether the present peak is larger than the predetermined threshold; and if the present peak is larger than the predetermined threshold, determining the point of symbol synchronization based on at least information associated with the present peak; and if the next peak is larger than the present peak, making the next peak become the present peak;

making the next peak time become the present peak time; and changing the peak count from the first positive integer to a second positive integer equal to a sum of the first positive integer and one.

12. The method of claim 11, and further comprising:

decoding the analog signal based at least in part on the point of symbol synchronization.

13. The method of claim 12, and further comprising:

generating an output signal based on at least information associated with the analog signal.

14. The method of claim 11, and further comprising:

receiving a spread-spectrum pseudo-noise sequence;

wherein the generating a stream of correlation results includes:

generating the stream of correlation results based at least in part on the spread-spectrum pseudo-noise sequence.

15. The method of claim 14 wherein the spread-spectrum pseudo-noise sequence is used to generate the analog signal.

16. The method of claim 11 wherein the determining a point of symbol synchronization further includes:

if the second sum is larger than the first sum and the third sum, if the next peak is not larger than the present peak, if the first positive integer is not equal to the first predetermined positive integer, making the peak count equal to a second predetermined positive integer.

17. The method of claim 16 wherein:

the first predetermined positive integer is equal to eight; and the second predetermined positive integer is equal to one.

* * * * *